(12) United States Patent
Khare et al.

(10) Patent No.: US 11,805,109 B1
(45) Date of Patent: Oct. 31, 2023

(54) DATA TRANSFER ENCRYPTION OFFLOADING USING SESSION PAIRS

(71) Applicant: Amazon Technologies, Inc., Seattle, WA (US)

(72) Inventors: Atul Khare, Sammamish, WA (US); Ravi Akundi Murty, Seattle, WA (US); Hassan Sultan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 527 days.

(21) Appl. No.: 16/285,086

(22) Filed: Feb. 25, 2019

(51) Int. Cl.
*H04L 9/40* (2022.01)
*H04L 29/06* (1970.01)
*H04L 9/08* (2006.01)
*H04L 67/14* (1970.01)
*G06F 12/14* (1970.01)

(52) U.S. Cl.
CPC ........ *H04L 63/0485* (2013.01); *H04L 63/0435* (2013.01); *H04L 63/0471* (2013.01); *H04L 63/166* (2013.01)

(58) Field of Classification Search
CPC ............. H04L 63/0485; H04L 63/0471; H04L 63/166; H04L 63/0435; H04L 29/067
See application file for complete search history.

(56) References Cited

U.S. PATENT DOCUMENTS

| | | | |
|---|---|---|---|
| 7,441,119 | B2 | 10/2008 | Brabson et al. |
| 8,041,940 | B1 | 10/2011 | Natanzon et al. |
| 9,195,851 | B1 | 11/2015 | Chandra |
| 9,712,503 | B1* | 7/2017 | Ahmed et al. ........ G06F 21/606 |
| 2003/0046585 | A1 | 3/2003 | Minnick |
| 2007/0101023 | A1 | 5/2007 | Chhabra et al. |
| 2008/0022094 | A1* | 1/2008 | Gupta et al. ........ H04L 63/0485 713/165 |
| 2008/0022124 | A1 | 1/2008 | Zimmer et al. |
| 2008/0267177 | A1 | 10/2008 | Johnson et al. |
| 2010/0228962 | A1 | 9/2010 | Simon et al. |
| 2016/0373414 | A1* | 12/2016 | MacCarthaigh ... H04L 67/1004 |
| 2017/0317991 | A1 | 11/2017 | Lionetti |
| 2018/0004954 | A1* | 1/2018 | Liguori et al. ........ G06F 21/575 |
| 2019/0124054 | A1* | 4/2019 | Zhang et al. ........ H04L 63/0428 |

FOREIGN PATENT DOCUMENTS

WO 2016209950 A1* 12/2016 ................G06F 21/606

OTHER PUBLICATIONS

Zongpu Zhang; Hubin Zhang; Junyuan Wang; Xiaokang Hu; Jian Li; Wenqian Yu; Ping Yu, Weigang Li, Bo Cui, Guodong Zhu, Kapil Sood; Brian Will; Haibing Guan; "QKPT: Securing Your Private Keys in Cloud With Performance, Scalability and Transparency"; IEEE; Vol. 20, Issue 1; Jan. 2023; pp. 478-490 (Year: 2023).*

* cited by examiner

*Primary Examiner* — Shewaye Gelagay
*Assistant Examiner* — Courtney D Fields
(74) *Attorney, Agent, or Firm* — Robert C. Kowert; Kowert, Hood, Munyon, Rankin & Goetzel, P.C.

(57) ABSTRACT

A computing device includes one or more processors, a memory and an encryption accelerator. The memory includes instructions that when executed on the processors cause a first networking session to be established between a pair of communication peers. Encryption of messages of the first session is enabled by a parameter of a security protocol of the session. The encryption accelerator obtains a key determined in the first session, and uses the key to encrypt messages of a second networking session established between the peers.

21 Claims, 12 Drawing Sheets

Step 0: One or both endpoints determine that data is to be transferred to the other endpoint
Step 1: Session A set up using standards-compliant handshake message sequence; as part of setup, encryption-via-primary-processors is enabled
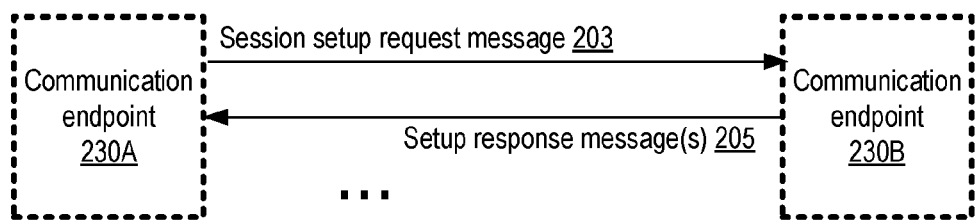
Step 2: CE's share secret key (or data that can be used to generate secret key) using messages that are encrypted on primary processors
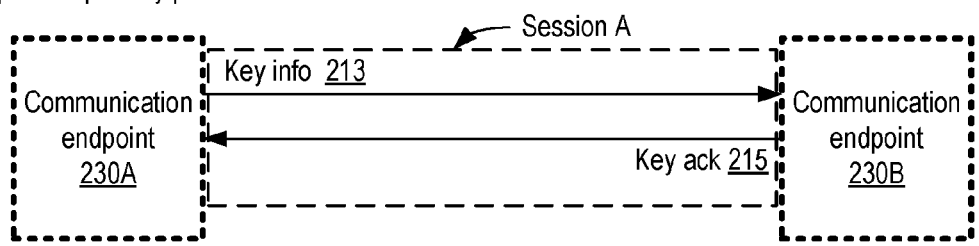
FIG. 2

Step 3: One or both endpoints terminate session A

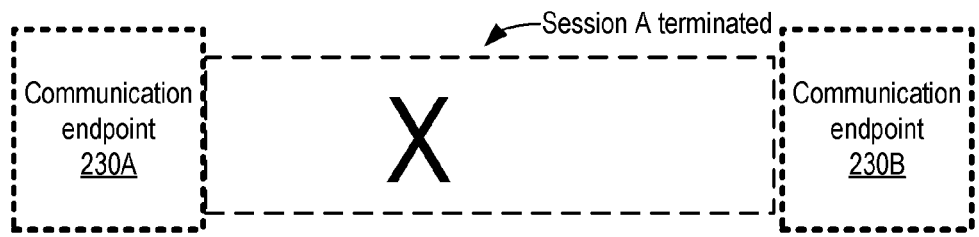

Step 4: Session B set up using standards-compliant handshake message sequence; as part of setup, encryption-via-primary-processors is disabled (e.g., by choosing "null" encryption algorithm)

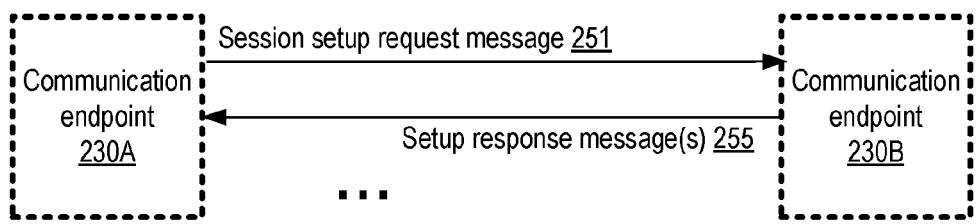

Step 5: One or both endpoints provide key to hardware encryption offloader, a configurable intermediary along message transfer path

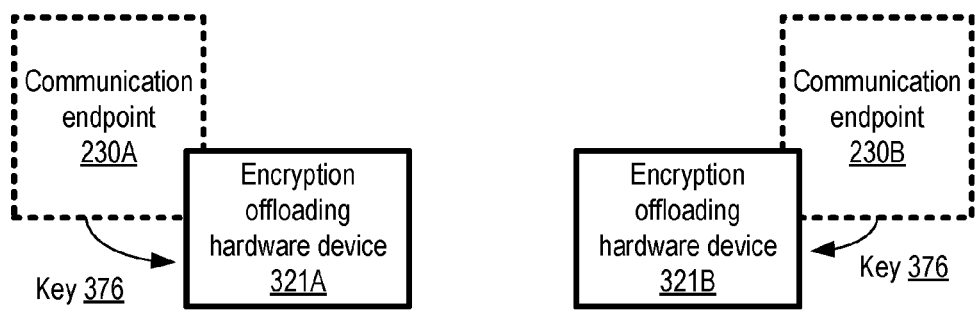

FIG. 3

Step 6: Data is transferred during Session B, with offloader performing encryption/decryption
(using key obtained during session A) on behalf of endpoints
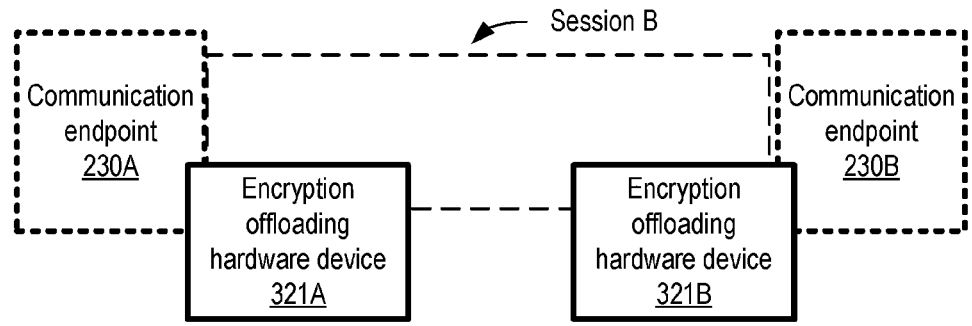
Step 7: After all the data is transferred/exchanged, Session B is terminated
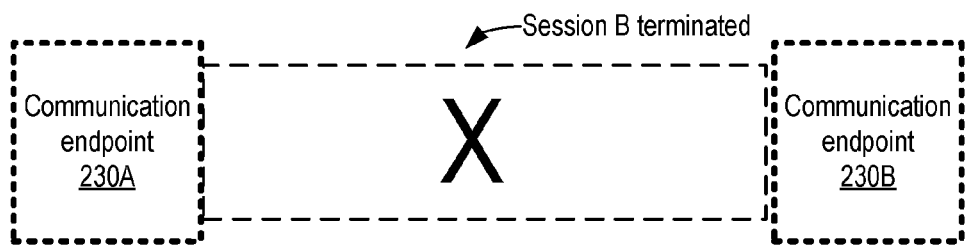
FIG. 4

Scenario 605A: One-side-offloads-encryption-and-decryption
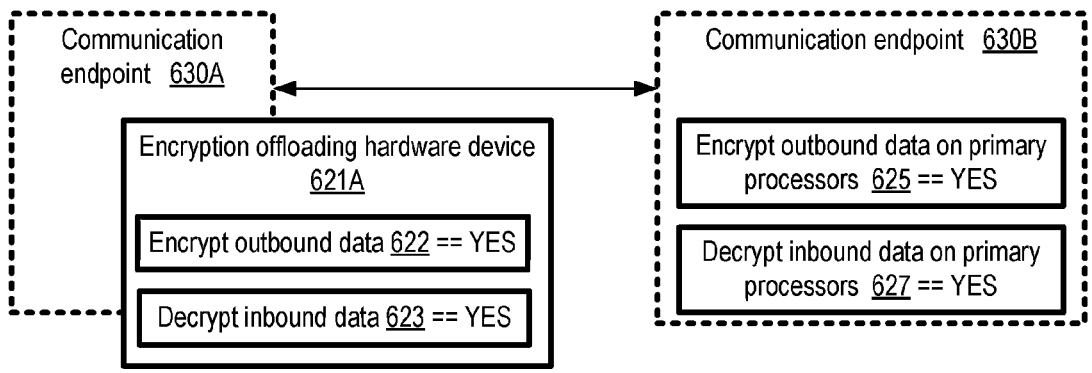
Scenario 605B: One-side-offloads-encryption-only
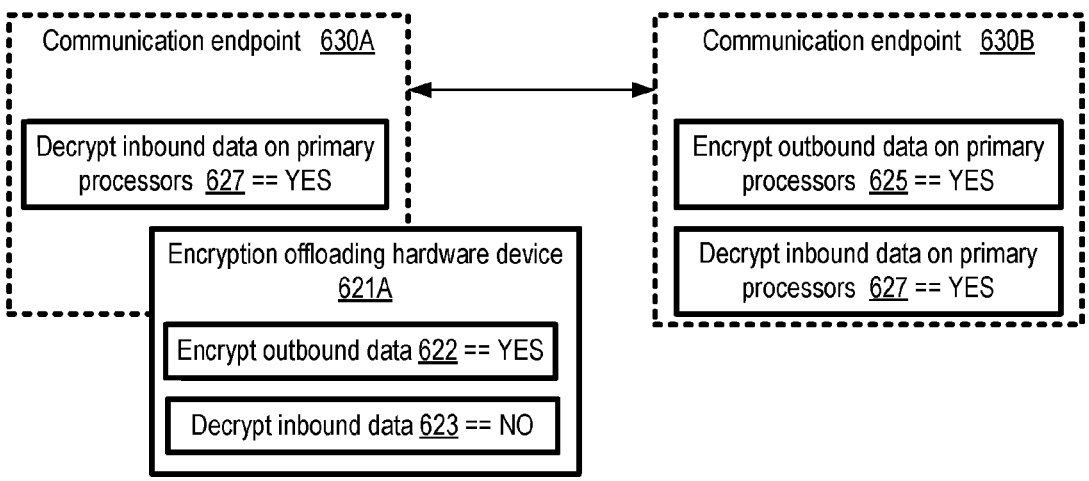
Scenario 605C: One-side-offloads-decryption-only
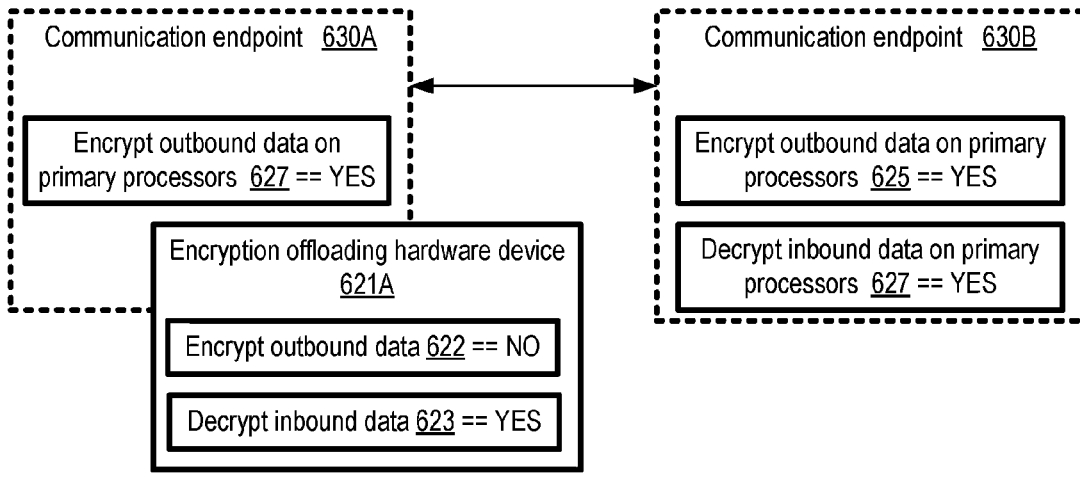
FIG. 6

DATA TRANSFER ENCRYPTION OFFLOADING USING SESSION PAIRS

BACKGROUND

In recent years, more and more computing applications are being run in execution environments in which large amounts of data has to be securely transferred over network connections. For example, many machine learning or artificial intelligence applications may require large data sets (potentially containing sensitive data) to be transferred from one computing platform to another, or a snapshot of state information of a virtual machine (which may be several gigabytes in size) may have to be transmitted from one host to another for balancing workloads. In many cases, applications involving the transfer of large amounts of data are implemented at provider networks or cloud-based platforms. A provider network may enable clients to acquire resources, such as virtual and/or physical computing devices, storage devices, and the like via easy-to-use programmatic interfaces, and run applications using combinations of the resources, with the provider network providing desired levels of scalability, availability, fault resilience and the like. The physical machines of the provider network may be distributed among numerous data centers in different cities, states or countries, in some cases enabling clients anywhere in the world to utilize a near-inexhaustible pool of resources.

A number of techniques, including TLS (Transport Layer Security), IPSec (Internet Protocol Security) and other protocols at various layers of the networking software/hardware stack have been developed to provide security for data transfers in various application domains, including e-commerce, virtual private networks (VPNs) and so on. Software libraries that implement popular security protocols are included in most operating systems, and application developers often rely on using such libraries. To prevent malicious entities from breaching the security of data transfers, sophisticated encryption algorithms compatible with the standard protocols may be employed.

Encryption algorithms may require substantial amounts of computing resources. Even with today's fast central processing units (CPUs), non-trivial portions of the available computing capacity of a server's CPUs may have to be devoted to encryption related processing for applications involving transfers of large data sets. Especially in multi-tenant provider network environments, where a given host may be used for virtual machines and applications on behalf of numerous end users, the impact of encryption-related processing of one application on the other applications running at the host may become significant.

BRIEF DESCRIPTION OF DRAWINGS

FIG. 2, FIG. 3 and FIG. 4 collectively illustrate an example sequence of operations of a secure data transfer using encryption offloading hardware devices, according to at least some embodiments.

FIG. 6 illustrates examples of asymmetric encryption offloading scenarios, according to at least some embodiments.

Figure 1:
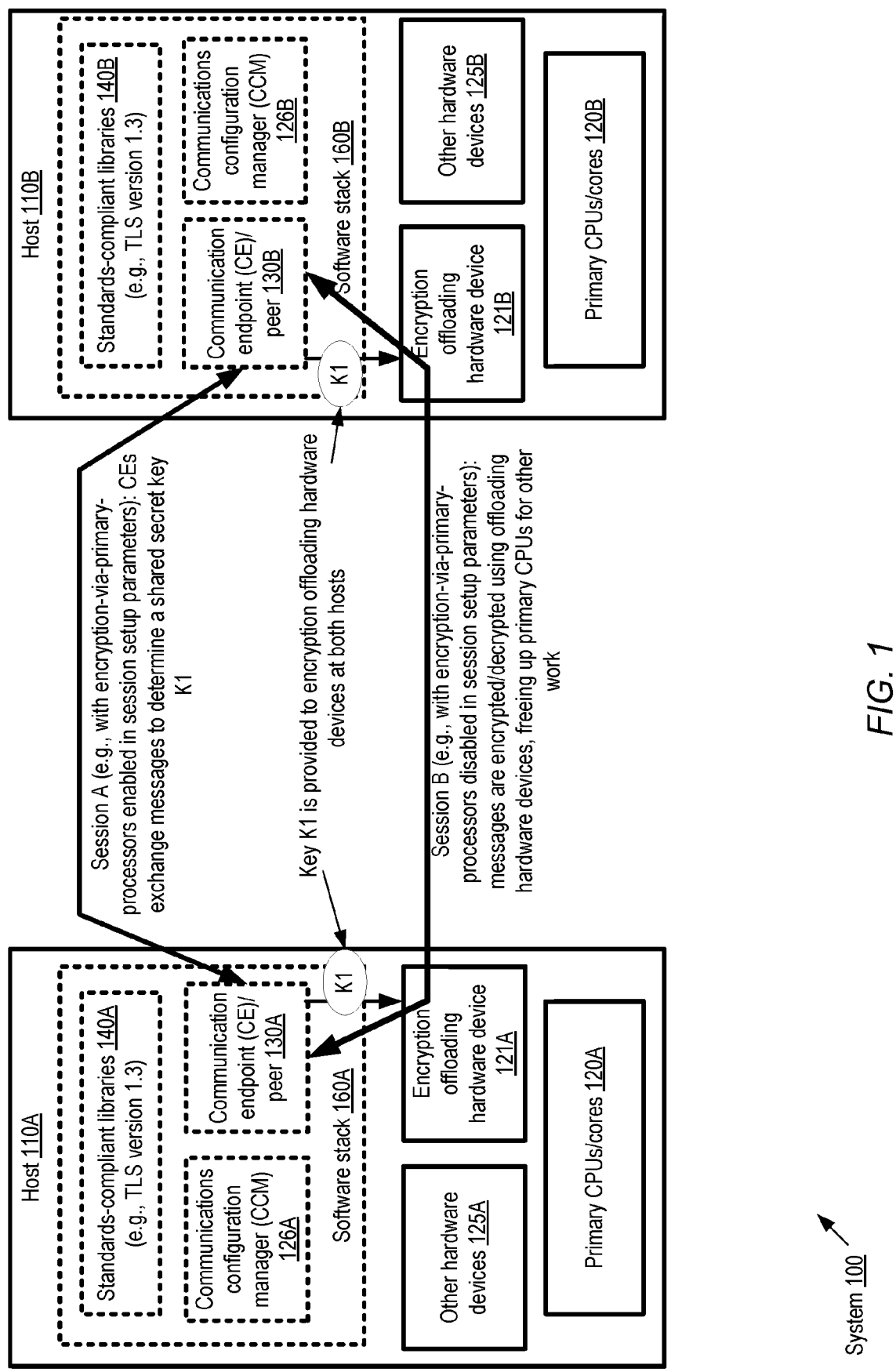
FIG. 1 illustrates an example system environment in which data transmitted between hosts during communication sessions that are compatible with software security protocols may be encrypted using offloading hardware devices to reduce the workload of the hosts' primary processors, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to the use of hardware acceleration for cryptographic operations performed on data transmitted between hosts in a distributed computing system. Specifically, the present disclosure relates to using offloading hardware devices for encrypting and/or decrypting host communications during communication sessions that are compatible with software security protocols (such as Transport Layer Security and similar widely-used protocols). In at least some embodiments, a pair of networking sessions may collectively be used to transfer a given data set between two entities or endpoints, with the first session being used to obtain a symmetric encryption key at both endpoints, and the data set being encrypted/decrypted at an offloading hardware device using the key in the second session. An offloading hardware device may, for example, comprise a portion of the circuitry of a system-on-chip (SOC) that is incorporated within a peripheral card configured as a networking intermediary at a host in some embodiments. Such circuitry may implement logic in hardware to perform, at very high throughputs and with very low latencies, encryption and/or decryption of data buffered at the SOC in accordance with one or more encryption algorithms; in some cases, the particular encryption algorithm to be employed may be selectable or configurable (e.g., a given offloading hardware device may be capable of implementing any of several encryption algorithms in some embodiments). Other architectures, which may not necessarily use SOCs, and may or may not be incorporated within a card connected via a peripheral interconnect, may be implemented in some embodiments.

As indicated by the use of the term "offloading", the objectives associated with the use of an offloading hardware device may include reducing the workload that has to be handled at the primary processors (e.g., CPUs or cores) of the hosts involved in the communications in various embodiments. The computations required for encrypting/decrypting large amounts (e.g., tens or hundreds of gigabytes) of data for transfer over a network may consume a substantial portion of the capacity of the primary processors if the encryption-related processing was performed entirely in software running on the primary processors. Beneficially the techniques described may be helpful in achieving levels of integrity, confidentiality and replay attack protection that are as good as, or better than, the levels that would be achieved if all the computations associated with data transfers were performed via software running on the primary processors, while freeing up potentially large fractions of the compute capacity of the primary processors to do other types of operations. Further, the disclosed techniques can beneficially allow the distributed computing system to more rapidly perform cryptographic operations on large, latency-sensitive transfers of data, for example the transfers of compute instance state snapshots during live migration of virtual computing instances from host to host. Additionally, TLS (as an example standard security protocol) is a highly complex industry standard protocol that is usually implemented in the operating system or in open source libraries (like OpenSSL). One of the barriers to using hardware based crypto acceleration for TLS (and other security protocols) is that there are not easy ways to modify these libraries without the risk of breaking existing functionality and/or introducing new vulnerabilities. The disclosed approaches beneficially may not require source code or binary modifications to TLS library code and can therefore work with existing TLS implementations.

Encryption offloading hardware devices may also be referred to as encryption accelerators or encryption engines in some embodiments. The terms "encryption-related processing" or "encryption-related computations" may be used in at least some embodiments to refer collectively to computations that may be performed for encryption as well as decryption. With respect to a given data transfer, the pair of entities (e.g., respective application programs, operating system components, virtualization management software components, and/or combinations of such entities) between which the data is to be transferred may be referred to as communication endpoints in various embodiments. In some embodiments, depending for example on the kind of application for which the data is transferred, the pair of communication endpoints may also or instead be referred to as a client-server pair (with one of the endpoints referred to as the client, and the other as the server), as communication peers, and so on. A given communication endpoint may comprise one or more threads of execution, e.g., within one or more processes of an operating system, a virtualization management program, and/or an application program running at a host in some embodiments.

An encryption offloading technique that utilizes a pair of networking sessions for a given data transfer may be employed in some embodiments. In such embodiments, a first standards-compliant secure networking session (e.g., a TLS session with software encryption enabled) may be established between two communication endpoints without using or relying on the encryption capabilities of the offloading hardware device. Such a session may be established, for example, in response to a determination at one or both endpoints that a data transfer is to be performed - e.g., in response to a programmatic request for a data transfer from an application user or client. The terms "encryption-via-primary-processors" or "encryption-via-software" may be used in at least some embodiments to refer to the use of software running on the primary processors (e.g., CPUs/cores) for encryption related computations, including both encryption and decryption, while the term "encryption-via-offloading" may be used in such embodiments to refer to the use of one or more devices other than the primary processors for encryption-related computations. Encryption-via-software may be enabled for the first session in various embodiments, e.g., based on one or more parameters of the session establishment procedure.

One or more messages of the first session (e.g., either during the session establishment phase itself, or after the session has been established) may be used by the two communication endpoints to securely exchange an encryption key (e.g., a symmetric shared secret key to be used to encrypt subsequent messages between the endpoints), and/or to exchange data that in turn can be used to generate the encryption key at each endpoint. After both endpoints have obtained or determined the key, the first session may be terminated in at least some embodiments, e.g., at the initiative of one or both endpoints, without actually transferring the data via the first session. A second standards-compliant session may also be established in various embodiments, with parameter settings during the establishment phase selected such that encryption-via-software is disabled for the second session. The encryption key that was obtained in the first session may be provided to a respective encryption offloading device, e.g., by one or both of the communication endpoints (or by agents/proxies on behalf of the communication endpoints). The data transfer may be performed within the second session, with (a) no encryption being performed in software running on the primary processors, and (b) encryption/decryption being performed at the offloading device(s) using the provided key. When the data transfer is complete, the second session may also be terminated.

In some embodiments, one or more configuration parameters (e.g., encryption-related parameters) of the second session may be determined at the endpoints during the first session, e.g., based on contents of one or more messages of the first session, a particular encryption algorithm to be employed at the offloading device(s) during the second session may be chosen. Note that the use of the labels "first" and "second" to refer to the sessions does not necessarily imply the sequence in which the session establishment operations for the two sessions are initiated or completed; the two sessions may be established at least partly concurrently, or in either of the two possible sequences (the encryption-via-primary-processors session before the encryption-via-offloading session, or the encryption-via-offloading session before encryption-via-primary-processors session) in different embodiments. The above-described technique may be referred to as multi-session encryption offloading or session-pair based encryption offloading in some embodiments.

In effect, in various embodiments, during the second session of a pair of sessions used for a given data transfer, the standards-compliant software running on the primary processors of a host at which a communication endpoint runs may not be informed or made aware that any encryption is being performed at all, while the data that is transmitted in one or more messages during the second session may actually be encrypted (at the sending side) using the offloading hardware and/or decrypted (at the side which receives encrypted data) using the offloading hardware. From the perspective of an end-user or the application on whose behalf the data is being transferred, the communication between the endpoints may be fully standards-compliant in various embodiments, requiring no non-standards-compliant code to be written within the application. Code interacting with the offloading device, e.g., to store the encryption key, to indicate the addresses of data buffers being used for the unencrypted or encrypted data, and/or to specify the particular encryption algorithm to be used, may be incorporated within lower levels of the software stack (e.g., in device drivers, virtualization managers or the like) in various embodiments, and as a result may not impact the applications. The first session, during which the encryption key is determined, may typically be very short in at least some embodiments; as a result, the fact that offloading is not used in the first session may result in very little overhead. The duration of the second session may vary with the total amount of data to be transferred, and may be quite long compared to the duration of the first session if a large data payload is transferred; as a result, the extent to which the primary processors are freed from having to perform encryption-related processing may increase with the amount of the data that is transferred in various embodiments. In at least some embodiments, the rate at which a dedicated offloading hardware device, optimized for the types of computations involved in encryption/decryption, is able to encrypt or decrypt data may exceed the rate at which primary processors could perform the same tasks.

As one skilled in the art will appreciate in light of this disclosure, certain embodiments may be capable of achieving various advantages, including some or all of the following: (a) improving the performance (e.g., the throughput and/or latencies) of secure data transfers between pairs of communicating entities, (b) improving the performance of other applications that run on the hosts at which the encryption offloading hardware devices are configured, by allowing more of the computing capacity of the hosts to be used for such other applications and/or (c) improving resource utilization levels at virtualized computing services, e.g., by speeding up various types of virtualization management and/or load balancing tasks including migrations of virtual machines from one host to another.

In at least some embodiments, variants of the basic encryption offloading technique introduced above may be employed. For example, in one embodiment, an asymmetric approach may be employed, in which one communication endpoint of the communicating pair of endpoints uses an offloading device for encryption and/or decryption in the second session, while the other endpoint performs encryption and/or decryption in software on the main processors. In another embodiment, an offloading device may only be used for encryption, and not for decryption; or, an offloading device may only be used for decryption, and not for encryption. Depending on the algorithm being used for encryption, in some cases encryption may be more compute-intensive than decryption (or vice versa), making choices to offload only encryption or to offload only decryption more appealing. In some embodiments, such choices may be made based for example on guidance or input from clients on whose behalf data is transferred, and/or based on heuristics or policies (e.g., data transfer size-based policies) of a system or service at which the data transfers are performed.

In at least one embodiment, computations for checking/enforcing data integrity (ensuring that the data eventually obtained or read at a recipient is actually the data that was sent by the sender, and has not been modified by a malicious intermediary) may be treated as a logically separate category of security-related operations from the tasks of encryption/decryption (in which a transformation function is applied to the "plain text" or unencrypted version at the sending side of a communication using a shared secret, and a logically inverse transformation function is applied at the receiving side using the shared secret). To check the integrity of message contents MC1, in one simple example scenario, a cryptographic hash function CHF (known to the recipient) may be applied to MS1 by the sender to obtain a hash result HR1. HR1 may be sent to the recipient along with (or separately from) MC1. The recipient may apply CHF to the received message, obtaining hash result HR2, and the integrity of the message contents may be verified by ensuring that HR1 and HR2 are identical. Note that encryption in this simple example scenario is orthogonal to data integrity checking; encryption/decryption may not necessarily be performed on MC1. In addition to or instead of using straightforward cryptographic hashes, other approaches towards data integrity checking, such as digital signatures and the like, may be used in various embodiments. In some embodiments, computations associated with data integrity checking as well as encryption/decryption may be offloaded from the primary processors on behalf of both communicating endpoints; in other embodiments, encryption and/or decryption may be offloaded, while data integrity checking may be performed using the primary processors at one or both endpoints. In some embodiments, the terms "encryption offloading device" may be used to refer to a device which is capable of offloading data integrity checking, encryption/decryption and/or other types of security-related computations from the primary processors of a host, with the respective categories of security-related computations being managed or controlled independently of each other. In at least one embodiment in which (a) an application layer security protocol similar to TLS is employed during a first session of a pair of networking sessions of the kind introduced above and (b) encryption/decryption as well as data integrity checks are offloaded for the second networking session, the second networking session need not utilize an application layer security protocol at all - e.g., the second networking session may comprise a straightforward TCP (Transmission Control Protocol) session, without using TLS.

According to some embodiments, a communications configuration manager, running for example as an administrative component of a host at which a communication endpoint runs, may be provided guidance by an application user or client regarding various parameters pertaining to offloading of encryption-related tasks. For example, one or more programmatic interfaces may be implemented to enable clients to submit encryption offloading configuration requests, indicating whether encryption/decryption is to be offloaded conditionally (and if so, indicating the conditions to be checked) or unconditionally, the types of messages for which such offloading is to be performed, preferences regarding specific algorithms to be used at the offloading devices, and so on. In some embodiments, not all data transfers may utilize offloading - for example, offloading devices may be employed only for data transfers that exceed a particular size. Thus, in such embodiments, offloading hardware devices may be employed only for data transfers in which the estimated or actual amount of data to be transferred exceeds a threshold; for smaller data transfers, encryption/decryption may be performed using the CPUs of the hosts involved in the transfer. In one embodiment, a determination may be made that offloading of encryption and/or decryption is to be performed for some messages of a given networking session, but not for other messages of the same session (e.g., based on message size considerations).

As mentioned earlier, according to some embodiments in which a pair of communication sessions are used for a data transfer, with the first session being used to determine a key to be supplied to an offloading device for use during the second session, values of one or more parameters of the second session may be determined during the first session. For example, a particular encryption algorithm to be used may be selected/proposed by one of the communication endpoints in the first session, and agreed to by the second communicating entity in the first session in some embodiments. Any of a variety of different encryption algorithms may be implemented in hardware at the offloading device, such as variants of AES-XTS (Advanced Encryption Standard - XEX-based tweaked-codebook mode with ciphertext stealing), AES-GCM (Advanced Encryption Standard - Galois/Counter Mode), and the like. Note that in case of some algorithms, such as the AES-GCM algorithm, data integrity checking as well as encryption/decryption may be offloaded - with AES associated with encryption and GCM being used for assuring data integrity.

Any of a number of different sources may be used to obtain or compute the key to be used at the offloading device(s) in various embodiments. For example, in some embodiments, Diffie-Hellman or a similar algorithm may be used to determine a key. In other embodiments, the key may be derived at one of the hosts involved in the communication using seeds or other data derived from an entropy source such as a Trusted Platform Module (TPM) or the like. In some embodiments, a network-accessible key management service (KMS), e.g., part of a suite of services of a provider network, may be used as a key source. In at least one embodiment, the two communication endpoints need not necessarily be running at different hosts; for example, communication endpoints running at respective guest virtual machines or processes on the same host may utilize the techniques described for offloading encryption for some types of data transfers in one embodiment.

Example System Environment

FIG. 1 illustrates an example system environment in which data transmitted between hosts during communication sessions that are compatible with software security protocols may be encrypted using offloading hardware devices to reduce the workload of the hosts' primary processors, according to at least some embodiments. As shown, system 100 may comprise a plurality of hosts among which network messages may be exchanged, including host 110A and host 110B. Each of the hosts 100 may include some hardware devices and a software stack 160 (e.g., software stack 160A of host 110A, and software stack 160B of host 110B). The hardware devices may include a respective set of primary processors (e.g., CPUs/cores 120A or 120B) at which various operating system and application components may typically run, as well as at least one respective encryption offloading hardware device 121 (e.g., device 121A at host 110A, and device 121B at host 110B) in the depicted embodiment. Respective hosts may also include a variety of other hardware devices 125 (e.g., 125A or 125B). In some embodiments, as discussed below in further detail, one or more of the hosts 110A and 110B may be used to run virtual machines on behalf of clients of a virtualized computing service. In one such embodiment, an encryption offloading hardware device 121 may be incorporated within a virtualization management offload card which offloads networking-related virtualization management tasks from the primary CPUs/cores 120, and thus already acts as an intermediary for network transfers between hosts. In at least one embodiment, a given host 110 may comprise multiple encryption offloading hardware devices, which may for example be used for transferring data for respective pairs of communication endpoints in parallel if needed.

The software stack 160 at each of the hosts 110 may, for example, include a communications configuration manager 126 (e.g., 126A or 126B), at least one communication endpoint (CE) 130 (e.g., 130A or 130B), and a set of standards compliant libraries 140 (e.g., libraries 140A or 140B) in various embodiments. A given communication endpoint (CE) 130 such as 130A or 130B, which may also be referred to as a communication peer, may comprise one or more threads of execution running on the primary CPUs/cores 120 of a host in the depicted embodiment. A CE may comprise, for example, a portion of an application (e.g., user-mode) program, an operating system component and/or a virtualization management software component, or a combination of such components in different embodiments.

A communications configuration manager (CCM) 126 may, for example, comprise one or more administration programs, processes and/or daemons responsible for determining and/or storing configuration metadata governing various properties of network transfers in the depicted embodiment, such as for example whether offloading of encryption-related processing is to be used for a given data transfer request, the kind of encryption algorithm to be employed at the offloading devices 121 for a given session, and so on. In at least one embodiment, the CCM 126 at a given host 110 may communicate with the encryption offloading hardware device 121 of the host, e.g., on behalf of a communication endpoint 130 of the host, to transmit a symmetric key to be used at the offloading device 121 for a given session. In some embodiments, the CCM 126 may indicate, to the offloading hardware device 121, the boundaries of one or more buffers set up in the offloading hardware device's memory to store data that is to be encrypted/decrypted, and/or the boundaries of one or more buffers into which results of the encryption/decryption operations performed at the offloading device are to be stored temporarily before they are provided to the communication endpoint 130. In various embodiments, as described below in further detail, a client on whose behalf a communication endpoint 130 is established may indicate various preferences regarding the desired scope and properties of encryption offloading in programmatic interactions with a CCM 126. A CCM may comprise one or more threads of execution (e.g., operating system processes) running on the primary CPUs/cores 120 of the host 110 in at least some embodiments. In some embodiments, for some types of applications, a given CCM 126 may itself communicate with a peer CCM at another host, and may utilize the encryption offloading hardware device 121 for the communication; that is, a CCM may itself be a communication endpoint.

The particular networking and/or security protocols whose libraries 140 are used at hosts 110 may vary in different embodiments - e.g., in some embodiments, TLS (Transport Layer Security) version 1.1 libraries may be used, in other embodiments TLS version 1.2 may be used, versions of SSL (Secure Sockets Layer) may be used, and so on. In some embodiments, multiple different libraries may be installed and/or usable at one or both hosts 110. In various embodiments, protocols that are compatible with the Internet protocol suite (the Transmission Control Protocol/Internet Protocol family of protocols) may be used; in other embodiments, protocols that are not compatible with the Internet protocol suite (e.g., custom protocols, deployed widely and thus standardized within the data centers of a cloud computing environment) may be used. Note that each host may of course include numerous other software and/or hardware components than those shown in FIG. 1. Furthermore, the software and/or hardware configurations of the two hosts 110A and 110B may not necessarily be identical in some embodiments - e.g., the two hosts may have different types/numbers of CPUs/cores 120, different types of encryption hardware offloading devices 121, different operating systems or versions, and so on.

In the depicted embodiment, in order to transfer at least one message or set of data between communication endpoints 130A or 130B, e.g., in response to a request received or generated at a host 110, a pair of standards-compliant networking or communication sessions with respective (different) configuration parameter settings may be utilized. Individual sessions of the pair are referred to as Session A and Session B in FIG. A. Session A may be established using standards-compliant libraries 140, with encryption-via-primary-processors enabled in the session setup parameters in the depicted embodiment. Examples of such parameters are provided below. A particular encryption algorithm may be selected by both endpoints involved in the communication during the session setup in various embodiments. Session A may be configured, during its establishment procedure or phase, such that encryption-related processing is performed, if needed for subsequent messages of session A, at the primary processors 120. Because encryption-via-primary-processors or encryption-via-software is enabled for Session A, in at least some embodiments information about a symmetric shared secret key K1 (or the key itself) may be securely exchanged via one or more messages between the two communication endpoints 130A and 130B. In some embodiments, one or more messages that are considered part of the session setup handshake sequence may be used to exchange key information; in other embodiments, one or more messages exchanged after the setup handshake may be used to exchange key information. In at least one embodiment, one or more configuration settings pertaining to Session B (e.g., the encryption algorithm to be employed for Session B) may also be exchanged and/or agreed to using one or more messages of Session A. In some embodiments, after the shared key K1 has been obtained/determined/computed at both hosts 110A and 110B, Session A may be terminated, e.g., at the request of one or both communication endpoints or communications configuration managers.

The shared key K1, determines using one or more messages transmitted during Session A, may be provided to the respective encryption offloading hardware devices 121 at each host 110 in the depicted embodiment. In some embodiments, as mentioned earlier, the CCM 126 at a host may provide the key to the offloading device, while in other embodiments, the communication endpoint at each host may provide the key. A standards-compliant Session B may be set up with parameter values selected such that encryption-via-primary-processors is disabled in the depicted embodiment. In addition, the respective encryption offloading hardware devices 121 at each host may configured (e.g., as a result of one or more commands issued by the CCMs and/or the CEs) to perform encryption/decryption in hardware for messages of Session B. The data that was to be transferred, for example from host 110A to host 110B, may be encrypted as part of Session B at the offloading device 121A and decrypted at encryption offloading hardware device 121B. Similarly, if required, contents of messages generated at communication endpoint 130B and directed to communication endpoint 130A during Session B may be encrypted at offloading device 121B and encrypted at offloading device 121A. After the data that was to have been transferred from either of the communication endpoints to the other has been transferred, and any responses have been received, Session B may be terminated in various embodiments. As a result, both sets of primary CPUs/cores 120A and 120B may be relieved of the responsibility for encryption/decryption processing during Session B in the depicted embodiment, and may therefore be used for other work.

The relative timings of the establishment of Session A, the establishment of Session B, the termination of Session A and the termination of Session B may vary in different embodiments, as long as the key K1 is communicated to at least one of the offloading devices before Session B messages containing data that is to be encrypted are transmitted from one CE 130 to the other. For example, in some embodiments, the sequence of the four session establishment/termination events may be as follows: (1. Session A established → 2. Session A terminated → 3. Session B established → 4. Session B terminated). In other embodiments, Session B may be established before (or at least partly concurrently with) the establishment of Session A, or before the termination of Session A. In one embodiment, Session A may not necessarily be terminated before Session B. An example sequence of events involving the use of two sessions to utilize offloading devices for encryption-related processing is provided below in FIG. 2 - FIG. 4. In one variation of the basic scheme indicated in FIG. 1, in at least one embodiment, Session B may be established such that encryption-via-primary-processors is enabled at one of the hosts 110, and not at the other. Other variants of the scheme are also discussed below in further detail.

Example Operation Sequence

FIG. 2, FIG. 3 and FIG. 4 collectively illustrate an example sequence of operations of a secure data transfer using encryption offloading hardware devices, according to at least some embodiments. In Step 0 of the operation sequence, shown in FIG. 2, a data transfer request may be received at a communication endpoint 230A, indicating that at least one set of data is to be transferred securely (e.g., using encryption to ensure the confidentiality of the data) from a host at which a first communication endpoint 230A is running, to another host at which a second communication endpoint 230B is running. Any of a number of different types of requests may trigger the use of encrypted communications in different embodiments - e.g., fulfilment of a request for a secure e-commerce transaction (which may for example include the transfer of sensitive financial information such as credit card numbers or the like) may require encryption, fulfilment of a request to transfer medical data (e.g., digitized results of scans and other medical results) from a laboratory to a doctor's office may require encryption, requests to transfer a snapshot of virtual machine state information from one virtualization host to another may require encryption, and so on. In some embodiments, the communication endpoint 230A may itself determine, e.g., based on results of one or more signals or computations, that a set of data is to be transferred securely to another endpoint 230B, and an externally-generated data transfer request may not be obtained.

In Step 1, also shown in FIG. 2, a networking session (Session A) may be set up, e.g., using a standards-compliant handshake message sequence in the depicted embodiment. As part of the handshake, values for one or more parameters of one or more messages may be selected such that encryption-via-primary-processors is enabled for Session A. A session setup request message 203 may be sent by one of the endpoints (e.g., 230A) to the other, and one or more response messages 205 may be sent back to implement the handshake. The specific parameters that are required, and/or parameters that are optional, in each of the messages of the handshake sequence may vary depending on the security protocol being used. Examples of some parameters that may be used in TLS handshakes in some embodiments, including a parameter value that may be used to enable the use of a particular algorithm for encryption, are provided below and discussed in the context of FIG. 5.

In Step 2 of the example operation sequence, as indicated in FIG. 2, the two communication endpoints 230A and 230B may use one or messages of session A exchange information about a shared secret key to be used to encrypt data to be transferred from endpoint 230A to endpoint 230B (and/or in the reverse direction). For example, in some embodiments, information 213 about the key, or the key itself, may be sent from endpoint 230A to 230B, and an acknowledgement 215 may be sent back to endpoint 230A from endpoint 230B. In some embodiments, depending on the security protocol being used, these messages containing key information may be considered part of the handshake sequence; in other embodiments, the key-related messages may not be considered part of the handshake used for session establishment.

Step 3 of the example operation sequence is shown in FIG. 3. In this step, Session A may be terminated, as indicated by the "X" symbol. The specific command/request/signal used to terminate the session may vary, depending on the protocols in use in different embodiments. In some embodiments, either communication endpoint 230A or 230B (or both endpoints) may initiate the termination. In other embodiments, other components of the hardware/software stack at the hosts at which the communication endpoints run may initiate or cause the termination of Session A.

In Step 4 of the example operation sequence, another session (Session B) may be set up using a standards-compliant handshake message sequence. In the case of Session B, however, in contrast to Session A, encryption-via-primary-processors may be disabled in the depicted embodiment, e.g., by specifying a "null" encryption algorithm. Note that in different embodiments, the specific parameter values that may be employed during session establishment to enable or disable encryption-via-primary-processors may differ (e.g., depending on the protocols being used). In some embodiments, a different security protocol (or even an entirely different networking stack or protocol family) may be used for Session B than was used for Session A. A session setup request message 251 may be sent from endpoint 230A in the depicted embodiment to endpoint 230B as part of the handshake, and one or more response messages 255 may be received at endpoint 230A from endpoint 230B.

In Step 5 of the example operation sequence, also shown in FIG. 3, one or both endpoints 230A may indirectly or directly provide the shared secret key 376 (which was determined in Step 2) to a respective encryption offloading hardware device 321 (e.g., offloading device 321A at the host where endpoint 230A runs, and/or offloading device 321B at the host where endpoint 230B runs).

Steps 6 and 7 of the example operation sequence are shown in FIG. 4. In Step 6, data may be transferred via one or more messages of Session B from endpoint 230A to endpoint 230B. Depending on the total amount of data that is to be transferred, the data may in some cases be subdivided into chunks or partitions, with each chunk being transmitted in a separate message. At the sending side for a given message (e.g., at the host of endpoint 230A), at least a portion of the contents of the message may be encrypted at the offloading device (e.g., 321A) using the key 376, while at the receiving side, the contents may be decrypted using the same key in the depicted embodiment. Note that in some cases, data may also be sent back in the reverse direction, with encryption/decryption being offloaded at each end from the host's primary processors in some embodiments.

After all the data has been transmitted or exchanged, Session B may be terminated in the depicted embodiment, as shown in Step 7. As in the case of the termination of Session A, shown in Step 3, the specific commands/messages/signals that result in the termination of Session B in Step 7, and/or the entities that issue the commands/messages/signals, may vary in different embodiments. In some embodiments, Session B (and/or Session A) need not necessarily be explicitly terminated in response to a request or command; instead, for example, one or both sessions may be permitted to expire as a result of inactivity. In some embodiments, as mentioned earlier, the order in which the sessions are set up and/or the order in which the sessions are terminated may differ from that shown in FIG. 2 - FIG. 4.

Example Session Setup Message Contents

Figure 5:
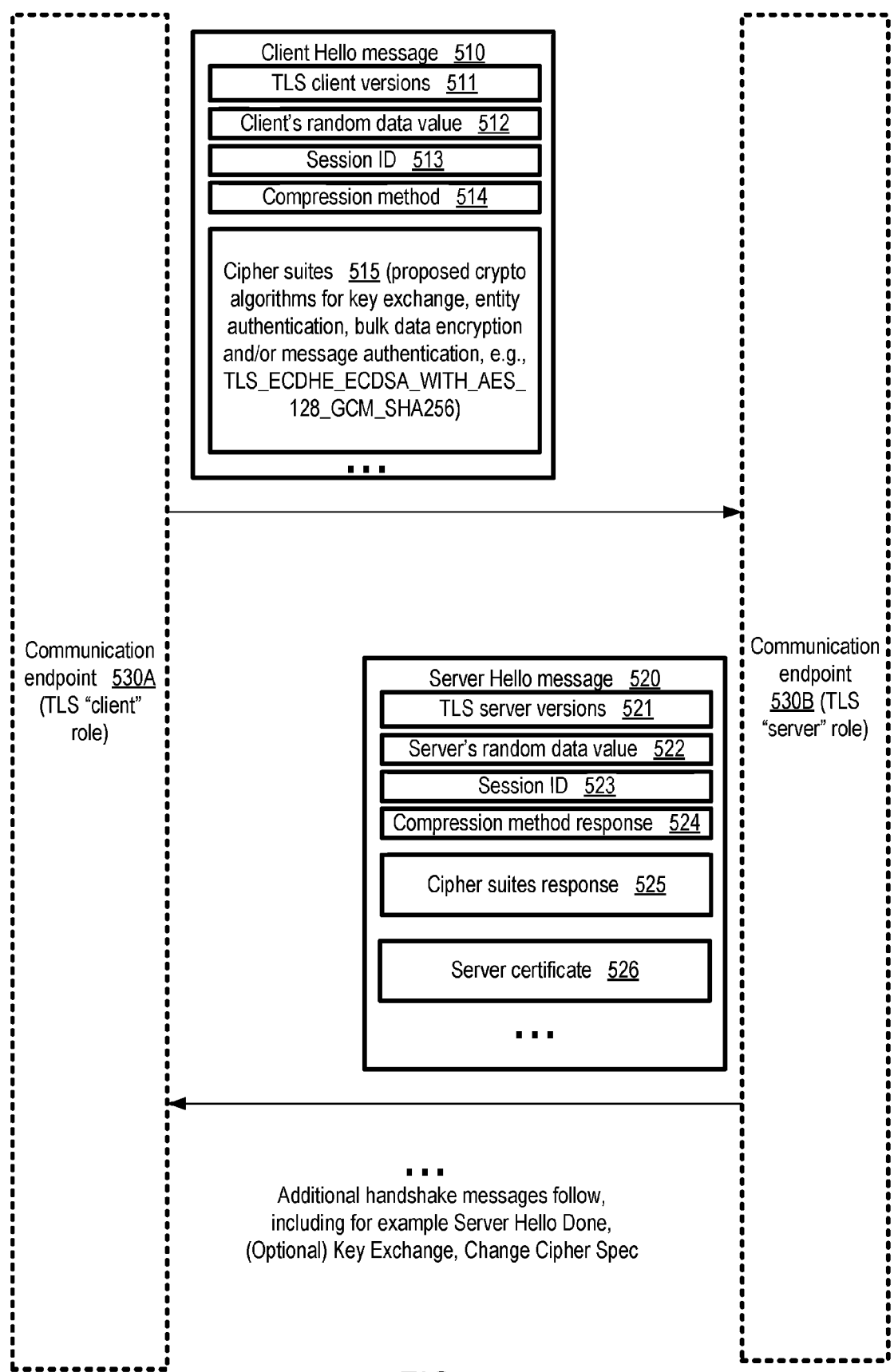
FIG. 5 illustrates an example of messages that may be exchanged, as part of a handshake sequence, to select an encryption algorithm to be used for a data transfer, according to at least some embodiments.

FIG. 5 illustrates an example of messages that may be exchanged, as part of a handshake sequence, to select an encryption algorithm to be used for a data transfer, according to at least some embodiments. In the depicted embodiment, a version of the Transport Layer Security protocol (or a similar protocol) may be used for setting up a networking session between communication endpoints 530A and 530B, with endpoint 230A assuming the role of a TLS client (the entity that initiates the handshake), and endpoint 530B assuming the role of the TLS server (to which the first message of the handshake is sent from the TLS client).

In the depicted embodiment, the handshake may begin by the transmission, from the TLS client to the TLS server of a message referred to as a "Client Hello" message 510. In effect, in the Client Hello message, the TLS client sends the TLS server a list of proposed properties of the session whose establishment is being initiated, with the objective being to obtain approval of the properties from the TLS server. For example, the client may indicate one or more versions 511 of TLS (and/or SSL) client libraries that the client is able to utilize for the proposed session. In some embodiments, the Client Hello message may include a random data value 512 (which may be used later to help generate an encryption key, if needed, for the session). In one implementation, for example, a 32-byte random value may be sent, of which 4 bytes represents the client's current timestamp (in epoch format), with the remaining 28 bytes comprising a number obtained from a random number generator. In one embodiment, a client may include a proposed session identifier 513. If the client includes a non-empty session identifier field 513 in the Client Hello message, in some embodiments this may indicate that the client is attempting to re-use an existing session, and the TLS server may attempt to search for a pre-existing cached session with that identifier. In some embodiments, the Client Hello message may include a compression method field 514 indicating the compression algorithm or technique that the client intends to use to compress message contents during the session (if the proposed compression method is accepted by the TLS server, which would perform the corresponding decompression operations).

A cipher suites parameter or field 515 of the Client Hello message may include an indication of one or more proposed cryptographic algorithms for one or more of the following types of operations with respect to the session being initiated in the depicted embodiment: key information exchange, entity authentication via digital signatures, bulk data encryption, and/or message authentication. For example, if the value of the cipher suite parameter is set to the TLS_ECDHE_ECDSA_WITH_AES_128_GCM_SHA256 value/constant defined in the TLS specification, this would indicate that the TLS client is proposing that: (a) the ECDHE (Elliptic curve Diffie-Hellman) algorithm be used for key exchange; (b) the ECDSA (Elliptic Curve Digital Signature) algorithm be used for entity authentication via digital signatures; (c) the AES_128_GCM (Advanced Encryption Standard 128-bit Galois/Counter Mode) algorithm be used for encryption performed at the primary processors; and (d) the SHA256 (Secure Hash Algorithm 256-bit) be used for message authentication. Note that in at least some embodiments, one or more values of the cipher suites parameter may indicate that encryption is not to be performed using software running at the primary processors - e.g., specifying a null encryption algorithm instead of AES_128_GCM in the above example may indicate that the TLS client is requesting that encryption not be performed via the primary processors. A number of different algorithm choices, including the null algorithm (equivalent to disablement), may be selected for individual ones of the four types of cryptographic operations (key information exchange, entity authentication via digital signatures, bulk data encryption, and/or message authentication) by the TLS client in different embodiments, while still maintaining compatibility with TLS. In various embodiments, the TLS client may thus be able to propose that zero or more of the four types of cryptographic operations be disabled (i.e., that no cryptographic computations be performed at the primary processors of the hosts) for the session being established. Note that operations (if any) performed at offloading devices may not be governed by the Client Hello message fields in at least some embodiments; the handshake mechanism illustrated in FIG. 5 may apply to the establishment of the session, and may not necessarily influence if/whether offloading is to be used once the session is established.

The TLS server endpoint 530B to which the Client Hello message was directed may respond with a Server Hello message 520 in the depicted embodiment. In the Server Hello message (which may typically be followed by a Server Hello Done message to indicate that the TLS server has completed its response), the TLS Server may in effect indicate to the TLS client whether the proposed properties of the session are acceptable. If the properties are acceptable, in some embodiments, further messages may be exchanged to complete session establishment, such as Key Exchange messages, Change Cipher Spec messages, and so on. If the properties are not acceptable, the handshake may be concluded without establishing the session.

In the Server Hello message 520, a TLS server versions field 521 may indicate that the TLS server supports a particular TLS version (which would ideally match one of the client's supported versions). A server-side random data value 522 may be included in some embodiments, which may be used in combination with the client's random data value 512 to generate an encryption key. In one implementation, for example, a 32-byte random value may be sent, of which 4 bytes represents the server's current time timestamp (in epoch format), with the remaining 28 bytes comprising a number obtained from a random number generator. If the Client Hello message included a non-empty session ID field 513, and the TLS server is able to find cached metadata pertaining to a previously-created session with the client-proposed session identifier, the session ID field 523 of the Server Hello message may send back the client's proposed session identifier, indicating in effect that the previous session is being resumed. Otherwise, the server may select a new session identifier and include it in field 523 in some embodiments. The compression method response field 525 may indicate whether the client's proposed compression technique (indicated in field 514 of the Client Hello message) is acceptable to the server. Similarly, in various embodiments, the cipher suites response message 525 may indicate whether the proposed combination of cryptographic algorithms indicated in field 515 are acceptable to the TLS server. In at least some embodiments, the Server Hello message 520 may also include a server certificate 526. The server certificate 526 may, for example, comprise a signed digital certificate which may be usable to prove the identity of the server to the TLS client. In one embodiment, the certificate field may also include a public key of the TLS server.

In some embodiments, one or more of the fields or elements of the Client Hello message 510 and/or the Server Hello message 520 shown in FIG. 5 may not be required or used, and/or other fields not shown in FIG. 5 may be populated. In various embodiments, one or more additional messages may be transmitted from the TLS server and/or the TLS client to conclude the handshake-based establishment of a networking session. Note that TLS represents just one example of a security protocol that may be employed in some embodiments; in other embodiments, other protocols with respective handshakes or session establishment procedures may be used.

Example Asymmetric Offloading Scenarios

As mentioned earlier, in some embodiments, the manner in which offloading of encryption/decryption is utilized at respective communication endpoints involved in a data transfer may differ. FIG. 6 illustrates examples of asymmetric encryption offloading scenarios, according to at least some embodiments. Note that the illustrated scenarios do not represent an exhaustive list; other types of asymmetric configurations may be employed in some embodiments.

In asymmetry example scenario 605A, offloading hardware device 621A associated with communication endpoint 630A may be employed to encrypt outbound data (as indicated by the "YES" setting shown for configuration parameter 622) and also to decrypt inbound data (as indicated by the "YES" setting shown for parameter 623). In contrast, at the communication endpoint 630B, both encryption (of outbound data) and decryption (of inbound data) may be performed using software running on primary processors, as indicated by the "YES" values of settings 625 and 627. Note that at least some of the parameters 622, 623, 625 and 627 are used to illustrate, at a high level, the manner in which encryption operations may be configured, and may not necessarily correspond in a 1:1 relationship to specific individual parameter settings of any particular algorithm or device. For example, to encrypt outbound data at the offloading device, it may be sufficient in some embodiments to load the data that is to be encrypted into one or more buffers accessible at the offloading device, without setting any particular parameter to "YES".

In asymmetry example scenario 605B, the decryption of inbound data of communication endpoint 630A may be performed using software running at primary processors (as indicated by the "YES" value for parameter 627 and the "NO" value for parameter 623), while encryption of outbound data may be performed at the offloading device 621A (as indicated by the "YES" value for parameter 622). At the other endpoint 630B, the primary processors may be used for both encryption and decryption.

In asymmetry example scenario 605B, the decryption of inbound data of communication endpoint 630A may be performed using the offloading hardware device, as indicated by the "YES" value of parameter 623. However, software running at primary processors (as indicated by the "YES" value for parameter 627 and the "NO" value for parameter 622) may be used for encryption of outbound data of communication endpoint 630A. At endpoint 630B, the primary processors may be used for both encryption and decryption. In other embodiments, other combinations of offloading device-based versus primary-processors-based encryption and decryption may be employed - e.g., the outgoing data from both endpoints may be encrypted using a respective offloading hardware device, while decryption may be performed using the primary processors, or encryption may be offloaded for one endpoint while decryption is offloaded for the other endpoint, and so on.

In at least some embodiments, as indicated above, data integrity checking computations may be treated orthogonally with respect to encryption/decryption, enabling additional kinds of asymmetry if desired (e.g., based on client preferences, the capabilities of the hardware offloading devices available at the endpoints, and so on). For example, data integrity computations may be offloaded at one or both endpoints, independently of whether encryption/decryption is being offloaded. As mentioned earlier, if both encryption/decryption and integrity checks are offloaded, then the second session of a session pair may be as simple as a standard TCP session in some embodiments. If only encryption/decryption is offloaded, and data integrity checking is desired, in various embodiments integrity checks may be performed in software on the primary processors in the second session, for example by using a TLS session with a null encryption algorithm while still using SHA256 or a similar algorithm for integrity checks.

Example Virtualized Computing Service

Figure 7:
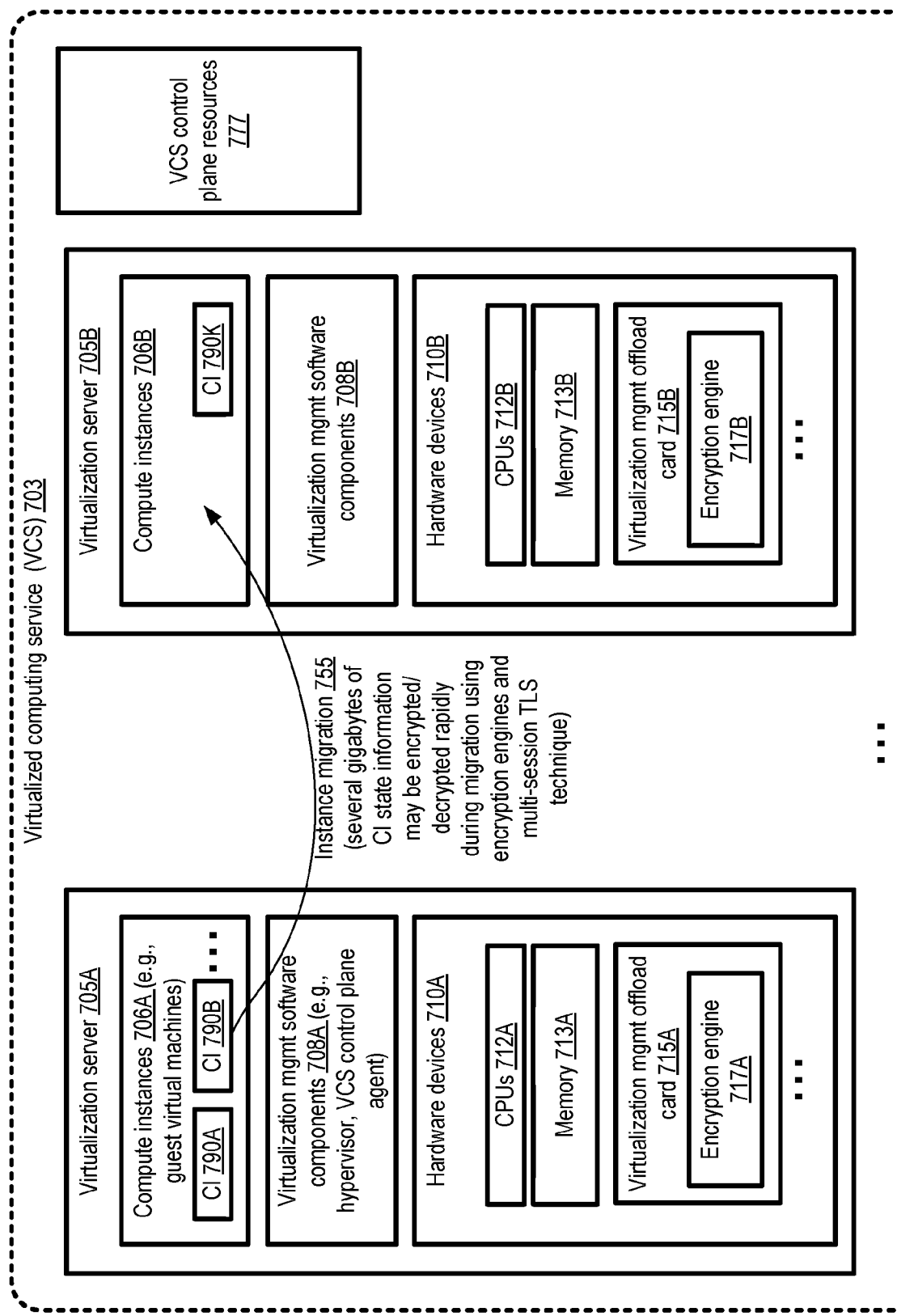
FIG. 7 illustrates an example virtualized computing service at which encryption engines incorporated within virtualization management offload cards may be utilized to support efficient migrations of compute instances between hosts, according to at least some embodiments.

In some embodiments, encryption offloading techniques similar to those introduced above may be employed for various types of data transfers to or from resources of a network-accessible virtualized computing service of a provider network or cloud environment. FIG. 7 illustrates an example virtualized computing service at which encryption engines incorporated within virtualization management offload cards may be utilized to support efficient migrations of compute instances between hosts, according to at least some embodiments. In the depicted embodiment, a virtualize computing service (VCS) 703 may comprise numerous virtualization servers 705 (e.g., 705A or 705B) at which compute instances such as guest virtual machines may be set up on behalf of VCS clients. The VCS 703 may also comprise a set of control plane or administrative resources 777, which may be responsible for receiving requests (e.g., requests to launch compute instances) from VCS clients, allocating/selecting virtualization servers at which compute instances are to be launched, configuring networking operations of the compute instances, monitoring resource usage, and so on.

A virtualization server 705 (which may also be referred to as a virtualization host) may comprise hardware devices 710 (e.g., 710A or 710B), virtualization management software components 708 (e.g., 708A or 708B), and zero or more compute instances 706 (e.g., 706A or 706B) at a given point in time in the depicted embodiment. The hardware devices 710 at a virtualization server may include, for example, one or more CPUs 712 (e.g., 712A or 712B) (the primary processors on which application software, operating system software and/or at least a portion of the virtualization management software components executes), memory 713 (e.g., 713A or 713B), and a virtualization management offload card 715 (e.g., 715A or 715B) in the depicted embodiment. A virtualization management offload card 715 may perform a subset of virtualization management tasks required for instantiating and executing the compute instances 706 at a server 705 in various embodiments, including for example networking-related virtualization management operations. As such, the offload card 715 may reducing the virtualization management workload that has to be run on the CPUs 712, and allow more of the computing capacity of the CPUs to be used for the compute instances 706. In one embodiment, the virtualization management offload card 715 may act as an intermediary for all network messages leaving or entering a virtualization server - e.g. any network message generated at a compute instance or at a virtualization management software component for a destination outside the server may be transmitted via the offload card, and any network message directed to a compute instance or virtualization management software component from outside the virtualization server may also be processed at the offload card. In some embodiments, at least a subset of the virtualization management offload cards 715 of the VCS virtualization server fleet may include respective encryption engines 717 (e.g., 717A or 717B). Such encryption engines 717 may be used to encrypt and/or decrypt various types of messages sent to or from virtualization servers using pairs of sessions as discussed above, e.g., on behalf of the compute instances 706, the virtualization management software components 708, and so on.

In the example scenario shown in FIG. 7, virtualization server 705A may comprise compute instances (CIs) 790A and 790B, while virtualization server 705B may comprise CI 790K. In the depicted embodiment, the VCS control plane resources 777 and/or local virtualization management software components 708A may determine, e.g., based on load balancing considerations and/or client requests, that one or more compute instances 790 that are currently running at a server 705A (the "source" server) are to be migrated to a different virtualization server 705B (the "destination" server). In order to migrate a given compute instance, in at least some embodiments a persistent representation or snapshot of state information of the compute instance (e.g., including the contents of at least a portion of memory allocated to the compute instance) may be generated at the source virtualization server and transmitted securely to the destination virtualization server. The snapshot may in some cases comprise several gigabytes of state data. To help ensure the confidentiality of the state information during such an instance migration 755 without burdening the CPUs 712A with encryption computations, in at least some embodiments, an encryption engine 717A at the source virtualization server 705A may be used to encrypt the state information. Similarly, in at least some embodiments, an encryption engine 717B at the destination virtualization server may be used to decrypt the encrypted state information, thus enabling more of the computing capacity of the CPUs 712B to be dedicated to other tasks. In some embodiments, a respective virtualization management software component 708 (e.g., an agent of the VCS control plane) at the source virtualization server and the destination virtualization server may act as the communication endpoints for a pair of network sessions of the kind discussed above: one session in which a shared secret key is generated, and one session in which encryption-via-primary processors is disabled and the shared secret key is employed at the encryption engine for encryption/decryption.

Encryption offloading may also or instead be used for other types of data transfers (not related to instance migration) at a virtualized computing service 703 in some embodiments. For example, in some cases, data sets may have to be transferred securely on behalf of applications running at respective compute instances 790 - e.g., from CI 790A to CI 790K, and the encryption/decryption of such data sets may be performed using the encryption engines 717. In one embodiment, an encryption engine 717 may be used to encrypt/decrypt data being transferred from one compute instance to another compute instance at the same virtualization server.

Example Offload Card Components

Figure 8:
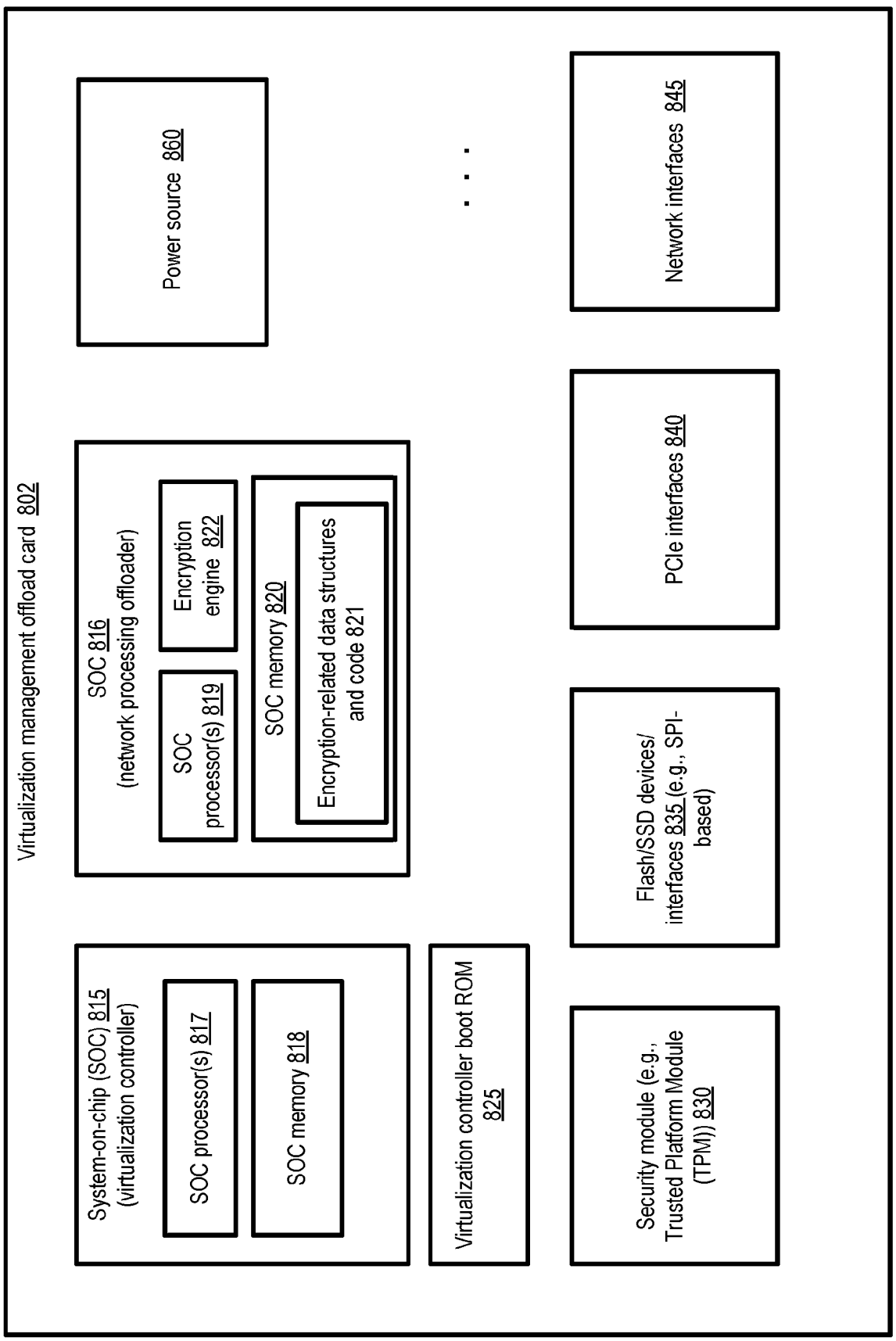
FIG. 8 illustrates example components of a virtualization management offload card, according to at least some embodiments.

FIG. 8 illustrates example components of a virtualization management offload card, according to at least some embodiments. Such a card may be incorporated within a virtualization server similar in features and functionality to the virtualization servers 703 of a virtualized computing service (VCS) shown in FIG. 7 in various embodiments. As shown, offload card 802 may comprise a pair of systems-on-chip (SOCs) 815 and 816, with SOC 815 being used for a virtualization controller and SOC 816 being used for offloading networking processing. The virtualization controller, as suggested by its name, may be responsible for organizing or orchestrating much of the virtualization management work performed at the server in some embodiments - e.g., it may be the first of the components of the server to boot, it may trigger the launches of other virtualization components, communicate with the VCS control plane, make memory allocation decisions with respect to compute instances, and so on. The network processing offloader SOC 816 may be responsible for implementing one or more networking protocols (including for example an encapsulation protocol used within the VCS) and acting as an intermediary between the communication endpoints within the virtualization server and communication endpoints outside the virtualization server in the depicted embodiment.

Each of the SOCs 815 and 816 may include a respective set of one or more SOC processors (e.g., processors 817 and 819), as distinguished from the primary processors of the virtualization server. Each SOC may comprise a respective memory, such as memory 818 and 820A. In the depicted embodiment, the SOC 816 may comprise an encryption engine 822 (e.g., circuitry that performs the computations of one or more encryption algorithms, such as AES-GCM or AES-XTS), and the SOC memory 820 may comprise encryption-related data structures and code 821. Encryption engines 822 (and other similar encryption offloading devices) may also be referred to as encryption accelerators in some embodiments. The encryption-related data structures may, for example, include one or more buffers, of which at least a subset may be designated to store encrypted and/or unencrypted data for a given networking session. The code may include executable instructions to store received shared secret keys for one or more sessions, to notify the encryption engine 822 where the key and data (e.g., to-be-encrypted data, or to-be-decrypted data) for a given session can be found, to trigger the encryption/decryption operations of the encryption engine 822, and so on in various embodiments. In some embodiments, an indication of a location of a buffer in SOC memory 820 (such as a start offset and size of the buffer), within which contents of one or more messages of a networking session are to be stored, may be provided to the encryption engine, e.g., by an administration component of the host and/or by a communication endpoint. In some embodiments, the encryption engine may be implemented as part of one of the SOC processors 819.

A secure boot ROM 825 may be used for an initial phase of a multi-phase boot operation by the virtualization controller in some embodiments. The offload card 802 may also include a security module (such as a trusted platform module (TPM)) 830, which may also be used extensively during the boot procedure and/or for post-boot state verification in some embodiments. In at least one embodiment, entropy data obtained from the security module 830 may be used to generate the shared secret key, e.g., in a first networking session of a pair of networking sessions used for a particular data transfer as discussed above.

In addition, the offload card 802 may comprise a number of storage, power and connectivity-related components in various embodiments. For example, one or more flash devices/interfaces (or SSDs) 835 may be incorporated within the offload card. These devices may be used, for example, to store firmware and/or software corresponding to various virtualization management components, compute instance components, and the like. Peripheral Component Interface - Extended (PCIe) interfaces 840 may be used for communicating with a hypervisor or other virtualization management software components running at the host's primary processors, and/or for communication among the SOCs in various embodiments. In other embodiments, other types of interconnects and corresponding interfaces may be used, such as variants of the QuickPath interconnect (QPI) or the UltraPath interconnect (UPI). Network interfaces 845 may be used for communications between the virtualization controller and the control plane of the virtualized computing service in some embodiments, as well as for data-plane communications between compute instances of the sever and various external endpoints in at least one embodiment. The offload card 802 may also comprise a power source 860 in some embodiments, e.g., sufficient to keep the components of the card 802 working for at least some targeted number of hours or days in the event of extended power failures. In some implementations, a supercapacitor-based power source may be used.

Separate SOCs on the same card may not be required for the offloaded virtualization manager components in some embodiments. For example, a single SOC capable of performing the virtualization controller functions as well as network offloading tasks may be utilized in one embodiment. In other embodiments, a separate card may be used for performing network processing tasks than is used for the virtualization controller. The set of offload card components shown in FIG. 8 is not intended to be comprehensive; several other components, such as timers and the like, may be incorporated at the card in some embodiments. In various implementations, at least some of the components shown in FIG. 8 may not be required.

Example Encryption Configuration-Related Programmatic Interactions

In various embodiments, one or more administration components of a host (e.g., part of a communications configuration manager similar to CCM 126 shown in FIG. 1) and/or a network accessible service (e.g., a component implemented at a VCS control plane resource 777 of FIG. 7) may store metadata related to encryption/decryption operations to be performed for various data transfers. In some embodiments, values of various encryption-related parameters (such as the specific type of encryption algorithm to be used for one or more sessions) may be selected by such administration components (e.g., using system-wide or service-wide default settings), without input from clients or users on whose behalf the data is to be transferred in the sessions. In other embodiments, clients may provide guidance or preferences regarding various aspects of encryption-related operations to the administration components via programmatic interfaces.

Figure 9:
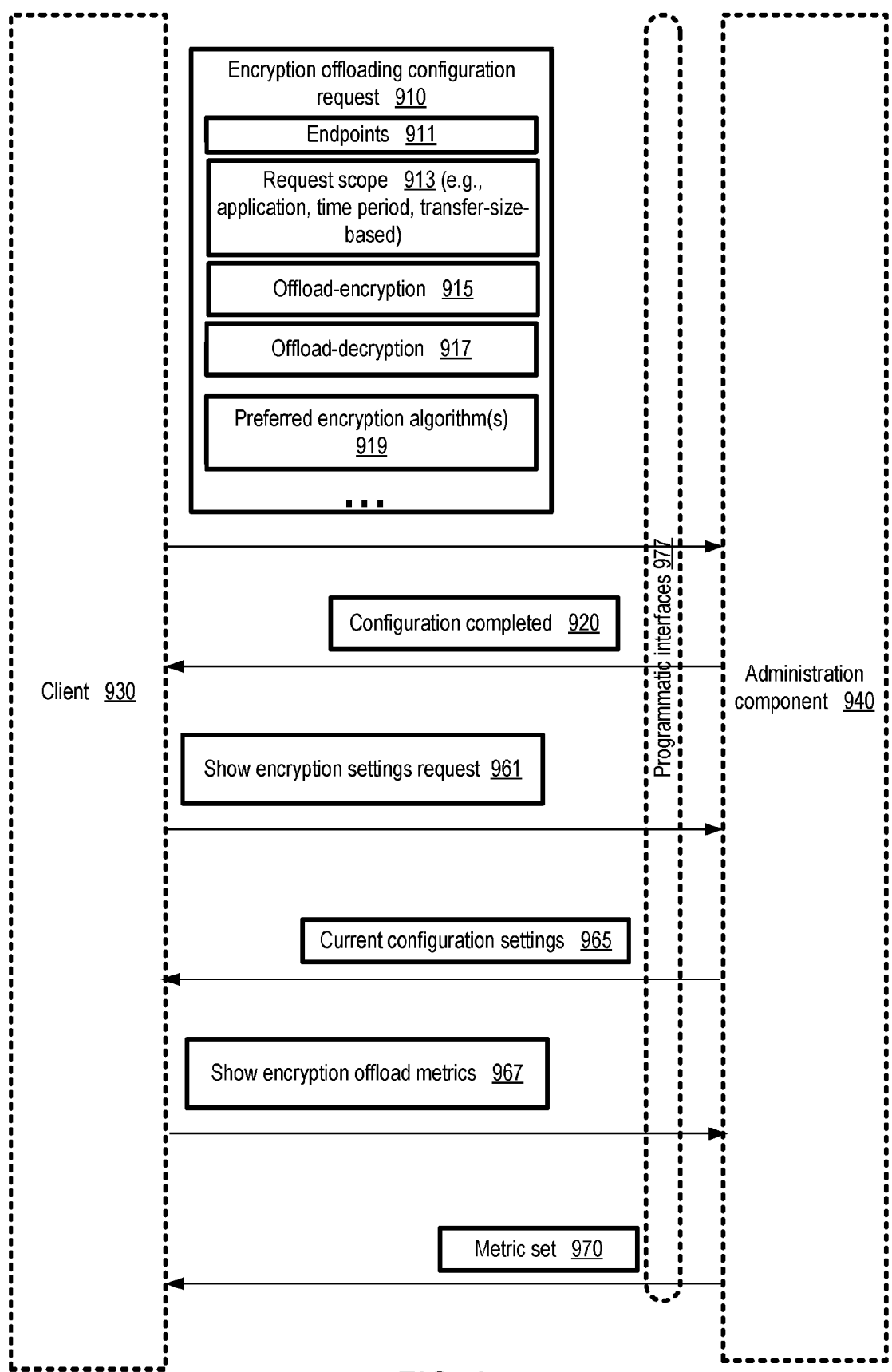
FIG. 9 illustrates example encryption configuration-related programmatic interactions between clients and an administration component, according to at least some embodiments.

FIG. 9 illustrates example encryption configuration-related programmatic interactions between clients and an administration component, according to at least some embodiments. The administration component may implement one or more programmatic interfaces 977 in the depicted embodiment, such as a set of application programming interfaces (APIs), a web-based console, command-line tools, graphical user interfaces and the like, which may be used by clients to submit encryption-related requests and receive corresponding responses.

Using such an interface, a client may submit an encryption offloading configuration request 910 in at least some embodiments, indicating that encryption computations and/or decryption computations are to be offloaded for at least some data transfers, and indicating requested properties of such offloading. Such a request may comprise one or more parameters or elements, including for example an endpoints parameter 911, a request scope field 913, an offload-encryption parameter 915, an offload-decryption parameter 917 and/or a preferred encryption parameter 919. The endpoints parameter 911 may indicate a set of communication endpoints whose encryption-related configuration settings are to be based on the contents of the request 910. In some cases, endpoints may be identified by a combination of one or more of (a) host names (e.g., with wildcards to indicate ranges of names), (b) IP (Internet Protocol) addresses or address ranges, (c) application names, and/or (d) process names or identifiers.

The request scope parameter or field 913 may indicate the set of data transfers whose encryption or decryption operations are to be offloaded based on other parameters of the offloading configuration request 910 in the depicted embodiment. For example, one value of the request scope parameter may indicate that all data transfers associated with a specified application or applications are to be covered by the requested encryption settings, another value may indicate a time period during which messages between the specified endpoints are to be covered, while yet another value may indicate that offloading operations are only to be performed for data transfers that exceed a specified threshold size (or are smaller than a specified threshold size) in some embodiments.

The offload-encryption parameter 915 may be set to indicate whether computations that are required to encrypt data are to be offloaded, while the offload-decryption parameter 917 may be set to indicate whether computations that are required to decrypt data are to be offloaded in the depicted embodiment. A client may specify a particular encryption algorithm to be employed at the offloading device using parameter 919 in various embodiments. In at least some embodiments, the administration component 940 may use default values of one or more of the parameters indicated in FIG. 9 if values are not indicated in the request 910 - for example, by default a 128 bit AES-GCM algorithm may be used for encryption, encryption and decryption operations along with data integrity checking may be offloaded, and so on. In at least one embodiment, a client may use a configuration request similar to request 910 to indicate that encryption-related processing is not to be performed for one or more messages or data transfers. In response to the configuration request 910, in scenarios in which the combination of parameters in the request is acceptable, the administration component 940 may store metadata indicating the parameters to be used for one or more data transfers, and transmit a configuration completed message 920 to the client 930 in at least some embodiments.

In at least one embodiment, a client 930 may submit a request 961 to view the current encryption settings with respect to some specified set of endpoints, or all the endpoints associated with the client, and the administration component may respond with a display or listing of the current configuration settings 965.

In at least one embodiment, metrics pertaining to offloading of encryption/decryption operations may be collected at or from one or more hosts equipped with offloading hardware devices of the kind discussed above, such as the total amount of data whose encryption and/or decryption was offloaded during a time interval, the time taken to encrypt/decrypt the data at the offloading device, the percentage of time that an offloading device was busy (analogous to CPU utilization metrics), and so on. In one such embodiment, a client 930 may submit a programmatic request 967 for such metrics to an administration component, and a set of metrics 970 may be provided in response. Other types of programmatic interactions related to encryption offloading may be supported in some embodiments, and/or some of the types of interactions illustrated in FIG. 9 may not be supported.

Example Provider Network Environment

Figure 10:
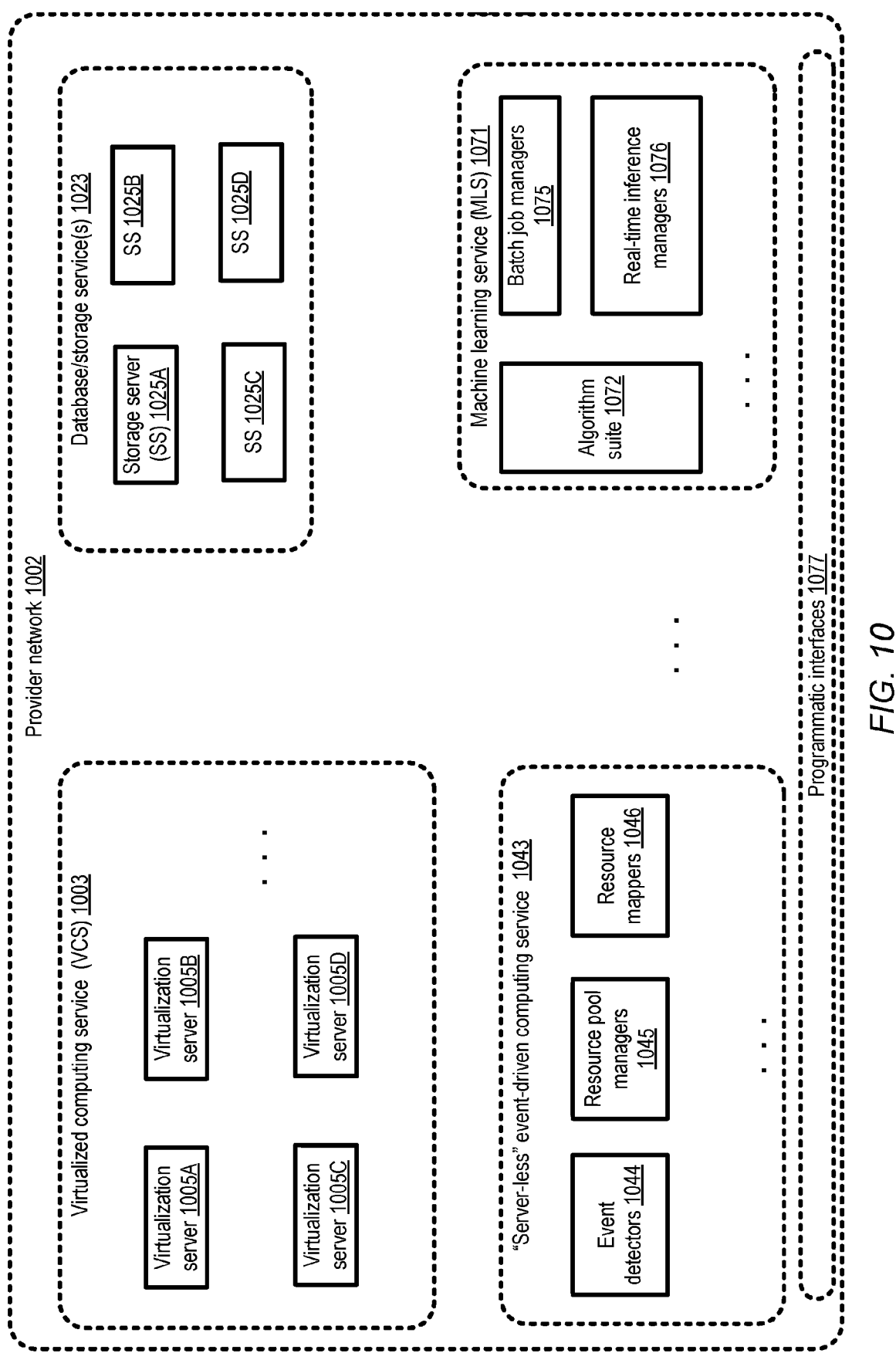
FIG. 10 illustrates an example provider network at which encryption offloading may be employed at one or more network-accessible services, according to at least some embodiments.

FIG. 10 illustrates an example provider network at which encryption offloading may be employed at one or more network-accessible services, according to at least some embodiments. As indicated earlier, networks set up by an entity such as a company or a public sector organization to provide one or more network-accessible services (such as various types of cloud-based computing, storage or analytics services) accessible via the Internet and/or other networks to a distributed set of clients may be termed provider networks in one or more embodiments.

The services implemented at provider network 1002 in the depicted embodiment may include, for example, a virtual computing service (VCS) 1003 (similar in features and functionality to VCS 703 of FIG. 7), one or more database/storage service(s) 1023, a "server-less" event-driven computing service 1043, and a machine learning service 1071. The VCS 1003 may comprise a plurality of virtualization servers 1005 (e.g., 1005A - 1005D), similar in functionality to servers 705 of FIG. 7, at which compute instances of various types may be instantiated for use by VCS clients in the depicted embodiment. Database/storage service 1023 may comprise a plurality of storage servers 1025 (e.g., 1025A - 1025D), at which database instances of various types (relational, object-oriented, key-value-based, and so on) and/or other types of storage objects may be set up on behalf of clients in various embodiments. In at least one embodiment, a storage service 1023 may comprise an object storage service that allows users to store unstructured data objects of arbitrary size, which can be retrieved using web services interfaces.

In contrast to VCS 1003, which may allocate individual compute instances (such as guest virtual machines) to clients and allow clients to access their allocated compute instances, the specific compute resources used to perform computations on behalf of clients may not be exposed to the clients at a "server-less" event-driven computing service 1043 in the depicted embodiment. Instead, for example, clients may submit requests for computations that are to be triggered based on specified events, and the service 1043 may select specific resources at which a particular computation is to be performed (e.g., using a specified type of run-time environment), cause that computation to be executed, and provide the result (e.g., in the form of another event), without indicating to the client where the computations are being performed. The service may be referred to as being "server-less" because specific virtual or physical servers are not pre-provisioned in advance of a computation request for the clients, or made visible or accessible to the clients of the service. In some embodiments, event detectors 1044 may respond to events specified by the clients of service 1043, resource pool managers 1045 may be responsible for maintaining a set of resources at which run-time environments can be utilized at short notice, and resource mappers 1046 may be responsible for selecting the particular resources if the pools that are to be used for a given computation.

At a machine learning service (MLS) 1071 of provider network 1002, a variety of machine learning algorithms represented in algorithm suite 1072 of FIG. 10 may be supported in the depicted embodiment. Batch or long-lasting machine learning tasks (such as training various models) may be coordinated by batch job managers 1075, while real-time prediction requests or the like may be handled at real-time inference managers 1076. The input data to be consumed by one or more machine learning models may be stored at or managed with the help of one or more of the database/storage services 1023. In some embodiments an MLS 1071 may include special-purpose computing devices such as servers at which a set of GPUs (graphical processing units) optimized for machine learning tasks are configured.

Figure 11:
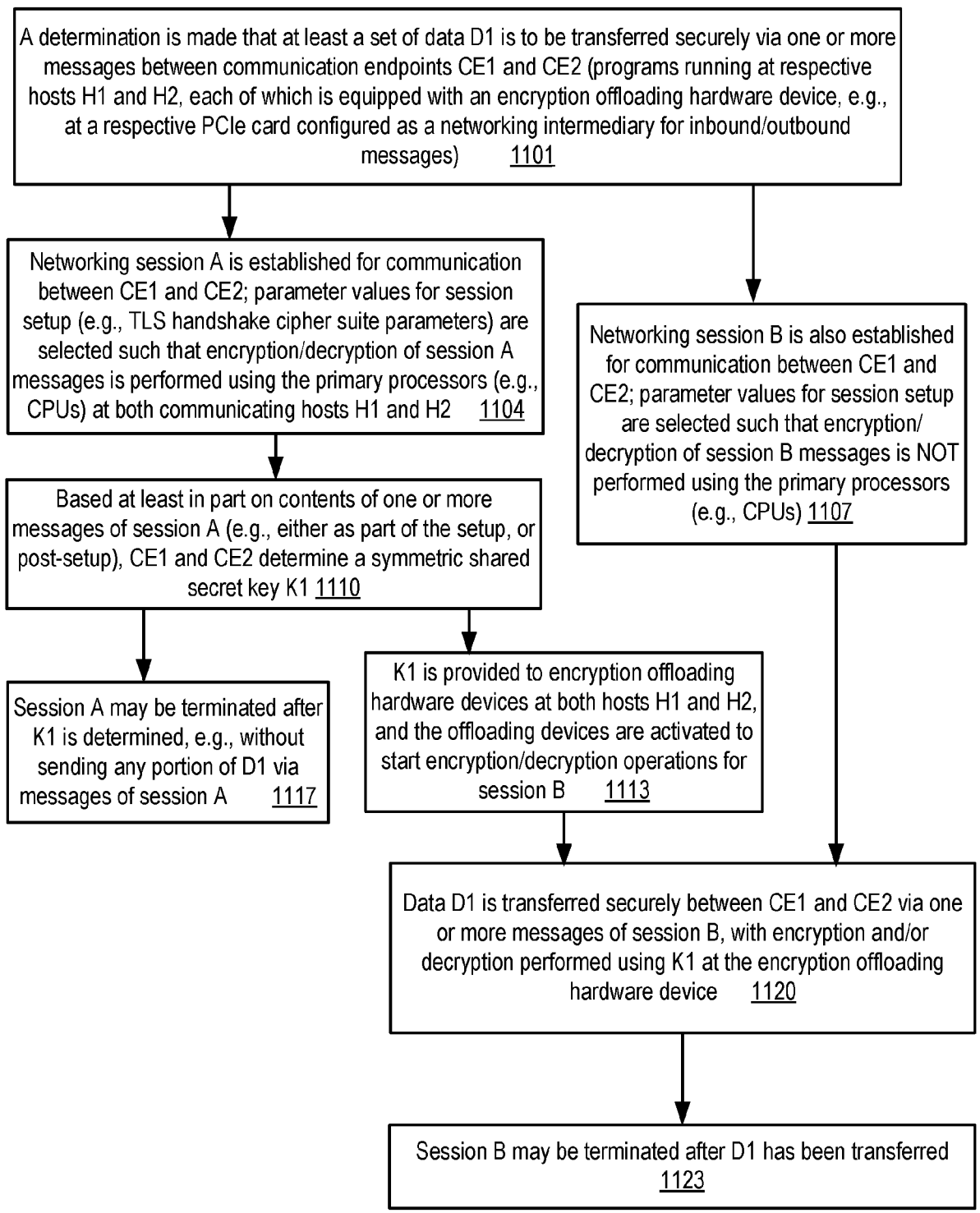
FIG. 11 is a flow diagram illustrating aspects of operations, including the establishment of a pair of networking sessions, that may be performed to encrypt transmitted data using offloading hardware devices, according to at least some embodiments.

In at least some embodiments, at least some of the servers used at one or more of the network-accessible services shown in FIG. 11 may include encryption offloading hardware devices of the kind discussed earlier. For example, at least a subset of virtualization servers 1005 and/or storage servers 1025 may each be equipped with one or more encryption offloading hardware devices; devices used at other service such as MLS 1071 and the server-less event-driven computing service 1043 may also include encryption offloading devices. Individual ones of the services of provider network 1002 may expose respective sets of programmatic interfaces 1077 to its clients in the depicted embodiment. In general several of the services may utilize resources of other services (for example, the machine learning service may utilize compute instances of the virtual computing service 1003 and/or storage servers of the database/storage services 1023). As such, various services of provider network 1002 may act as clients of other services, and may utilize the programmatic interfaces of the other services in the depicted embodiment.

For many types of applications implemented using the services of provider network 1002, secure transfers of large data sets may be needed, and the encryption offloading techniques introduced earlier may be utilized. For example, training data sets, test data sets and inputs for batch-mode operations of the MLS 1071 may comprise sensitive data that has to be kept confidential, and such data may be transferred among various computing devices of the MLS itself, the VCS 1003 and/or storage services 1023. Similarly, for various types of tasks performed at the event-driven computing service 1043, data sets (including for example executable programs) may have to be securely transferred from one resource to another. As indicated earlier, secure data transfers may also be required for some types of intra-service operations, such as for compute instance migration similar to those discussed in the context of FIG. 7. In these and other scenarios, multi-session encryption offloading techniques similar to those discussed earlier may be employed in various embodiments.

In some embodiments, at least some of the techniques discussed above for configuring and performing encryption offloading may be implemented without acquiring resources of network-accessible services such as those shown in FIG. 10.

Methods for Offloading Encryption Operations

FIG. 11 is a flow diagram illustrating aspects of operations, including the establishment of a pair of networking sessions, that may be performed to encrypt transmitted data using offloading hardware devices, according to at least some embodiments. As shown in element 1101, a determination may be made that at least one set of data D1 is to be transferred securely via one or more messages in either direction between two communication endpoints CE1 and CE2. CE1 and CE2 may, for example, comprise respective programs or processes running at a pair of hosts H1 and H2, with each host being equipped with a respective encryption offloading hardware device in some embodiments. Such an offloading device may, for example, be incorporated within a respective PCIe card at one or both hosts in one embodiment. In some embodiments, in which the hosts H1 and H2 are being used as virtualization servers at which one or more compute instances or guest virtual machines are run, the encryption offloading devices may comprise encryption engines incorporated within virtualization management offload cards. Note that in some cases, some of the data that is to eventually be transferred between CE1 and CE2 may not be known in advance - e.g., after an initial set of data is provided from CE1 to CE2, it may be the case that another set of data may be provided in response from CE2 to CE1. In at least one embodiment both CE1 and CE2 may be running at the same host.

A networking session A may be established for communication between CE1 and CE2 (element 1104) in the depicted embodiment. One or more parameter values for session establishment or setup (e.g., similar to a TLS cipher suites handshake parameter) may be selected such that any required encryption and/or decryption of data during session A is performed using software running at the primary processors (e.g., CPUs) at both hosts involved in the communication.

Based at least in part on contents of one or more messages of session A (e.g., either during the session setup/establishment phase, or post-setup), CE1 and CE2 may both determine a symmetric shared secret key K1 (element 1110). Any of a variety of techniques may be used to determine the key in various embodiments For example, in some embodiments, Diffie-Hellman or a similar algorithm may be used to derive a key. In at least one embodiment, K1 may be derived at one or both of the hosts H1 and/or H2 using seeds derived from an entropy source such as a Trusted Platform Module (TPM) or the like. In some embodiments, a network-accessible key management service (KMS), e.g., part of a suite of services of a provider network, may be used as a key source.

According to at least some embodiments, session A may be terminated after the key K1 has been determined by both CEs (element 1117). In various embodiments, session A may be used primarily for exchanging K1, or information that can be used by CE1 and/or CE2 to generate K1, and session A may not be used to transmit any of the data D1. As such, although session A may be set up to use encryption-via-primary-processors, the primary processors may not actually be used to encrypt or decrypt D1 in such embodiments.

Another networking session, session B, may also be established between CE1 and CE2 (element 1107) in various embodiments. In contrast to session A, parameters for session B may be selected such that encryption/decryption for session B messages is not performed using the primary processors of the hosts H1 and H2 in at least some embodiments.

The key K1, which was determined in operations corresponding to element 1113, may be obtained at the encryption offloading hardware devices at the hosts H1 and H2 in the depicted embodiment (element 1113). In at least some embodiments, after K1 has been provided to a given offloading device, that offloading device may be activated or signaled to start performing encryption/decryption on the contents of buffers into which data associated with session B is stored.

CE1 and CE2 may utilize one or more messages of session B to transmit D1 (and/or other data) securely in various embodiments (element 1120). Encryption and/or decryption of the data (e.g., encryption of outbound data, and decryption of inbound data) may be performed at each host by the offloading hardware device, using K1 as the symmetric encryption key, and freeing up the primary processors of the hosts H1 and/or H2 to perform other tasks. After at least data D1 has been transferred, in various embodiments session B may be terminated (element 1123).

Note that the relative ordering of at least some events illustrated in FIG. 11 may vary in different embodiments. For example, session A and session B need not be established in any specific order; A may be established before B, B may be established before A, or A and B may be established at least partly concurrently in different embodiments. Similarly, the relative timing of the termination of the two sessions may vary in various embodiments. In some embodiments, session B may have been established before CE1 and CE2 determine K1; in other embodiments, session B may be established after CE1 and CE2 determine K1. It is noted that in various embodiments, at least some operations other than those illustrated in the flow diagram of FIG. 11 may be used to implement the encryption offloading techniques described above. Some of the operations shown may not be implemented in some embodiments.

Use Cases

The techniques described above, of offloading encryption and decryption computations to a hardware device so as to reduce the load on the primary processors of hosts at which communication endpoints run, while maintaining compatibility with industry standard security protocols, may be useful in a variety of scenarios. Many type of applications, for example in the machine learning or artificial intelligence domains, virtualization management and the like, may require secure transfers of large amounts of data between hosts. Such applications may often be designed and developed to make use of industry standard protocols for networking; requiring the applications to be adapted to use non-standard hardware or software may not be practicable. Especially in multi-tenant environments where multiple programs (such as compute instances set up on behalf of several different clients) have to share available compute resources, transferring responsibilities for compute-intensive tasks such as encryption and decryption of network messages to offloading hardware devices while still using standard protocols may help improve the performance of numerous applications, including not just the applications on whose behalf the messages are being transferred, but also the other applications running on the hosts.

Illustrative Computer System

Figure 12:
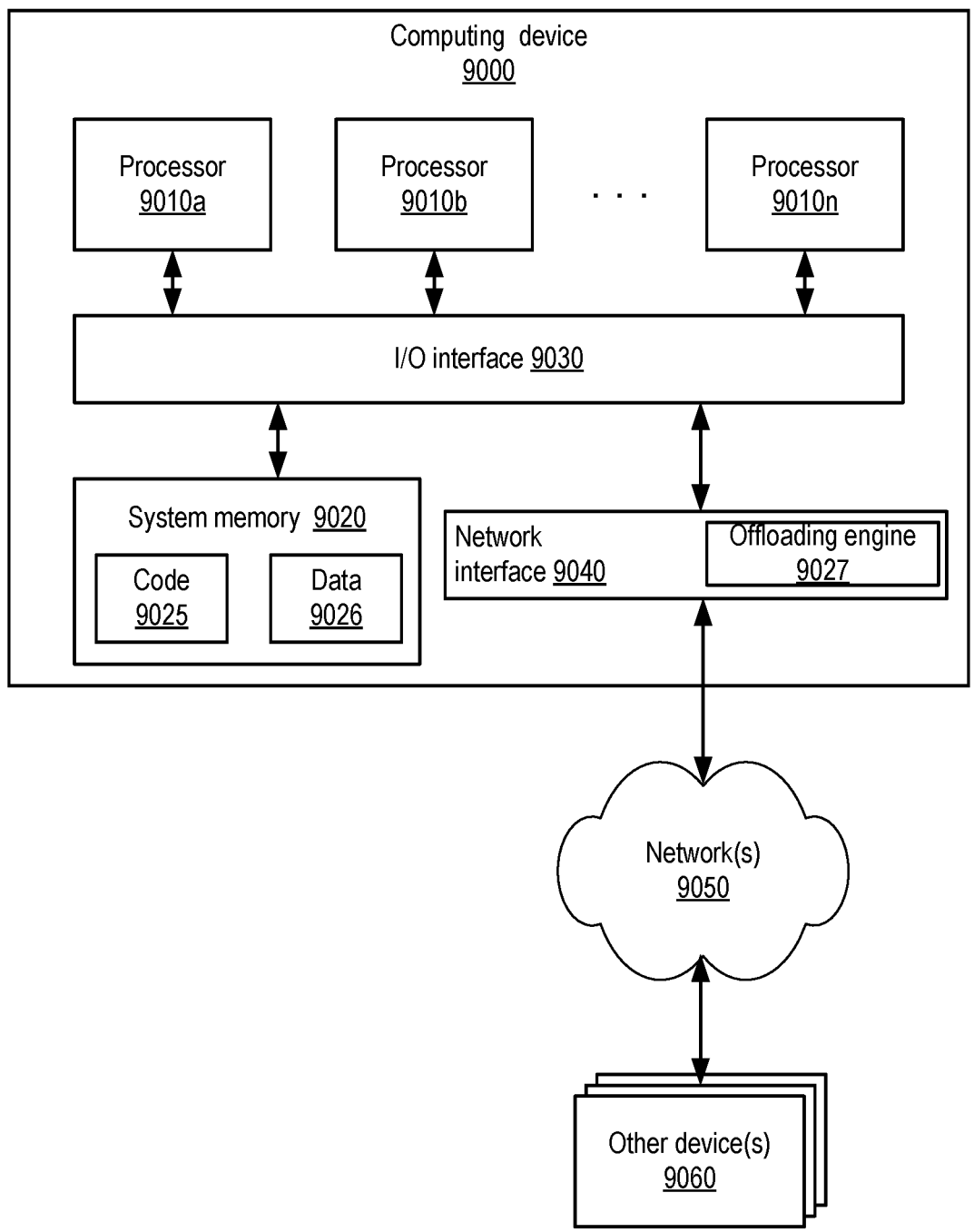
FIG. 12 is a block diagram illustrating an example computing device that may be used in at least some embodiments.

In at least some embodiments, a server that implements a portion or all of one or more of the technologies described herein, including the communication endpoints on whose behalf the networking sessions are established, configuration managers and other administration components that store metadata representing encryption-related configuration settings, as well as various components of network-accessible services of a provider network and/or the client devices that interact with such services, may include a general-purpose computer system that includes or is configured to access one or more computer-accessible media. FIG. 12 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030. As shown, the network interface 9040 may include an offloading engine 9027 in at least some embodiments, at which encryption/decryption computations of the kind described above may be implemented. In some embodiments the offloading engine may not necessarily be incorporated within a network interface.

In various embodiments, computing device 9000 may be a uniprocessor system including one processor 9010, or a multiprocessor system including several processors 9010

(e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 11, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 11 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 12 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A method, comprising:

performing, at a plurality of computing devices:

establishing, in accordance with a security protocol, a first networking session between (a) a first communication endpoint at a first host and (b) a second communication endpoint at a second host, wherein, in one or more handshake messages used to establish the first networking session, a first value of a protocol parameter identifies a first encryption algorithm of the first networking session for encryption by a primary processor at the first host;

determining, by the first communication endpoint and the second communication endpoint based at least in part on one or more messages of the first networking session between the first and second networking endpoints, a symmetric shared secret key;

causing, by at least one communication endpoint of the first and second communication endpoints, the first networking session between the first and second networking endpoints to be terminated;

subsequent to termination of the first networking session, establishing a second networking session between the first communication endpoint and the second communication endpoint in accordance with the security protocol, wherein, in one or more handshake messages used to establish the second networking session, a second value of the protocol parameter indicates that encryption by the primary processor at the first host is not going to be used in the second networking session;

obtaining, at an encryption offloading device of the first host, the symmetric shared secret key determined in the first networking session between the first and second networking endpoints; and encrypting, at the encryption offloading device of the first host using the symmetric shared secret key, contents of a message directed from the first communication endpoint to the second communication endpoint in the second networking session that is established subsequent to termination of the first networking session.

2. The method as recited in claim 1, further comprising performing, at the plurality of computing devices:

determining, based at least in part on one or more programmatic requests, that the encryption offloading device is to be utilized for one or more messages between the first communication endpoint and the second communication endpoint.

3. The method as recited in claim 1, wherein the encryption offloading device is incorporated within a virtualization management offload card of the first host.

4. The method as recited in claim 1, further comprising performing, at the plurality of computing devices:

determining, by at least the first communication endpoint, based at least in part on one or more messages of the first networking session, one or more encryption-related parameters of the second networking session.

5. The method as recited in claim 1, further comprising performing, at the plurality of computing devices:

decrypting, at the second host, without utilizing an encryption offloading device, encrypted contents of the message.

6. A system, comprising:

a plurality of computing devices, including a first computing device and a second computing device, wherein the first computing device includes a first central processing unit and a first encryption offloading device;

wherein the plurality of computing devices include instructions that upon execution on or across the plurality of computing devices cause the plurality of computing devices to:

establish a first networking session between a first communication endpoint at the first computing device and a second communication endpoint at the second computing device, wherein at least some messages of the first networking session are encrypted in accordance with a security protocol used for the first networking session;

cause an encryption key determined in the first networking session by the first and second communication endpoints to be obtained at the first encryption offloading device of the first computing device; and obtain, at the second communication endpoint, a decrypted version of a message of a second networking session between the first and second communication endpoints subsequent to termination of the first networking session, wherein contents of the message were encrypted at the first encryption offloading device, not the first central processing unit, of the first computing device, using the encryption key determined in the first networking session.

7. The system as recited in claim 6, wherein the second computing device includes a second encryption offloading device, wherein the plurality of computing devices further include instructions that upon execution on or across the plurality of computing devices further cause the plurality of computing devices to:

cause the encryption key to be provided to the second encryption offloading device, wherein the decrypted version is generated by the second encryption offloading device.

8. The system as recited in claim 7, wherein the plurality of computing devices further include instructions that upon execution on or across the plurality of computing devices further cause the plurality of computing devices to:

obtain, at the first communication endpoint, a decrypted version of another message of the second networking session, wherein contents of the other message were (a) generated at the second communication endpoint, (b) encrypted at the second encryption offloading device using the encryption key and (c) decrypted at the first encryption offloading device using the encryption key.

9. The system as recited in claim 6, wherein the plurality of computing devices further include instructions that upon execution on or across the plurality of computing devices further cause the plurality of computing devices to:

obtain an indication, via a programmatic request, that offloading of encryption using the first encryption offloading device is to be performed for one or more messages.

10. The system as recited in claim 6, wherein the plurality of computing devices further include instructions that upon execution on or across the plurality of computing devices further cause the plurality of computing devices to:

determine that the first encryption offloading device is not to be employed for one or more messages to be transferred during a third networking session; and encrypt or decrypt, using the first central processing unit, at least one message of the one or more messages transferring during the third networking session.

11. The system as recited in claim 10, wherein to determine that the first encryption offloading device is not to be employed, the plurality of computing devices further include instructions that upon execution on or across the plurality of computing device further cause the plurality of computing devices to:

determine that an amount of data to be transferred during the third networking session is below a threshold.

12. The system as recited in claim 6, wherein the first encryption offloading device comprises circuitry of a virtualization management offload card, wherein the virtualization management offload card is linked to the first central processing unit of the first computing device via a peripheral interconnect.

13. The system as recited in claim 6, wherein the security protocol comprises a version of Transport Layer Security (TLS).

14. The system as recited in claim 6, wherein the plurality of computing devices include further instructions that upon execution on or across the plurality of computing devices further cause the plurality of computing devices to:

implement, using one or more central processing units, one or more data integrity operations on the message of the second session.

15. The system as recited in claim 6, wherein the plurality of computing devices include further instructions that upon execution on or across the plurality of computing devices further cause the plurality of computing devices to:

determine, based at least in part on one or more programmatic requests, an encryption algorithm to be executed at the first offloading device in the second session.

16. A computing device, comprising:
one or more processors;
an encryption accelerator; and
a memory;
wherein the memory includes instructions that upon execution on or across the one or more processors cause:
 a first networking session between a first communication peer and a second communication peer to be established, wherein encryption of at least some messages of the first networking session is enabled in accordance with a parameter of a security protocol used to establish the first networking session; and
 an encryption key determined in the first networking session by the first and second communication peers to be provided to the encryption accelerator; and
wherein the encryption accelerator is configured to:
 encrypt, using the encryption key determined in the first networking session between the first and second communication peers, contents of a message of a second networking session established between the first and second communication peers subsequent to termination of the first networking session, wherein the contents of the message are encrypted at the encryption accelerator, not the one or more processors.

17. The computing device as recited in claim 16, wherein the encryption accelerator is further configured to:
 decrypt, using the encryption key, contents of another message of the second networking session.

18. The computing device as recited in claim 16, wherein the memory includes further instructions that upon execution on or across the one or more processors further cause:
 an indication of a location of a buffer, within which contents of one or more messages of the second networking session are stored, to be provided to the encryption accelerator.

19. The computing device as recited in claim 16, wherein the memory includes further instructions that upon execution on or across the one or more processors further cause:
 an indication to be obtained that offloading of encryption is not to be performed for one or more messages.

20. The computing device as recited in claim 16, wherein the encryption key is determined based at least in part on one or more of: (a) a Diffie-Hellman algorithm, (b) entropy data obtained from a security module, or (c) one or more communications with a network-accessible key management service of a provider network.

21. The computing device as recited in claim 16, wherein the security protocol comprises a version of Transport Layer Security (TLS), and wherein the second networking session comprises a TCP (Transmission Control Protocol) session in which TLS is not used.

\* \* \* \* \*